(12) United States Patent
Bonessio

(10) Patent No.: US 12,435,769 B2
(45) Date of Patent: Oct. 7, 2025

(54) SHAPE-MORPHING APPARATUS FOR SHOCK AND VIBRATION PROTECTION

(71) Applicant: METAseismic, Inc., Berkeley, CA (US)

(72) Inventor: Noemi Bonessio, Berkeley, CA (US)

(73) Assignee: METAseismic, Inc., Berkeley, CA (US)

( * ) Notice: Subject to any disclaimer, the term of this patent is extended or adjusted under 35 U.S.C. 154(b) by 0 days.

(21) Appl. No.: 18/741,593

(22) Filed: Jun. 12, 2024

(65) Prior Publication Data

US 2025/0271046 A1 Aug. 28, 2025

Related U.S. Application Data

(60) Provisional application No. 63/472,656, filed on Jun. 13, 2023.

(51) Int. Cl.
*F16F 7/00* (2006.01)

(52) U.S. Cl.
CPC ........ *F16F 7/00* (2013.01); *F16F 2230/0052* (2013.01)

(58) Field of Classification Search
CPC ............................ F16F 7/00; F16F 2230/0052
See application file for complete search history.

(56) References Cited

U.S. PATENT DOCUMENTS 5,169,110 A * 12/1992 Snaith ................. F16F 7/14
267/148
5,509,238 A * 4/1996 Scalfati ................. E04H 9/021
52/167.7
5,897,093 A * 4/1999 Le Derf ................. F16F 7/14
248/570
10,174,467 B1 * 1/2019 Li ........................ E01D 19/042
(Continued)

FOREIGN PATENT DOCUMENTS

CN 106894666 B 5/2019
EP 1122457 A1 4/2006
(Continued)

OTHER PUBLICATIONS

International Search Report and Written Opinion, PCT/US2024/033659, mailed Oct. 4, 2024.

*Primary Examiner* — Thomas W Irvin
(74) *Attorney, Agent, or Firm* — Master Key IP, LLP; Justin G. Sanders

(57) ABSTRACT

A shape-morphing apparatus is disclosed for reducing the transmission of vibrational forces between a vibration source and an object. In at least one embodiment, a first composite layer provides a first upper plate and a vertically spaced apart first lower plate connected with the first upper plate. A second composite layer provides a second upper plate and a vertically spaced apart second lower plate connected with the second upper plate. A lower surface of the first lower plate is in lateral sliding abutting contact with an upper surface of the second upper plate. The first and second composite layers are held in sliding abutting contact by at least two clips. The clips are interconnected with one another by at least one resilient retainer positioned and configured for biasing the clips—and, in turn, the first and second composite layers—into a neutral position.

19 Claims, 15 Drawing Sheets

(56) References Cited

U.S. PATENT DOCUMENTS

| | | |
|---|---|---|
| 11,300,176 B2 | 4/2022 | Bonessio |
| 12,000,449 B2 | 6/2024 | Bonessio |
| 2010/0251637 A1* | 10/2010 | Nishimoto .............. E04H 9/021 |
| | | 52/167.8 |
| 2018/0216687 A1 | 8/2018 | Thompson et al. |
| 2022/0042566 A1* | 2/2022 | Burr ........................ A42B 3/12 |

FOREIGN PATENT DOCUMENTS

| | | |
|---|---|---|
| KR | 20140005622 U | 10/2014 |
| WO | 1985000207 A1 | 1/1985 |

* cited by examiner

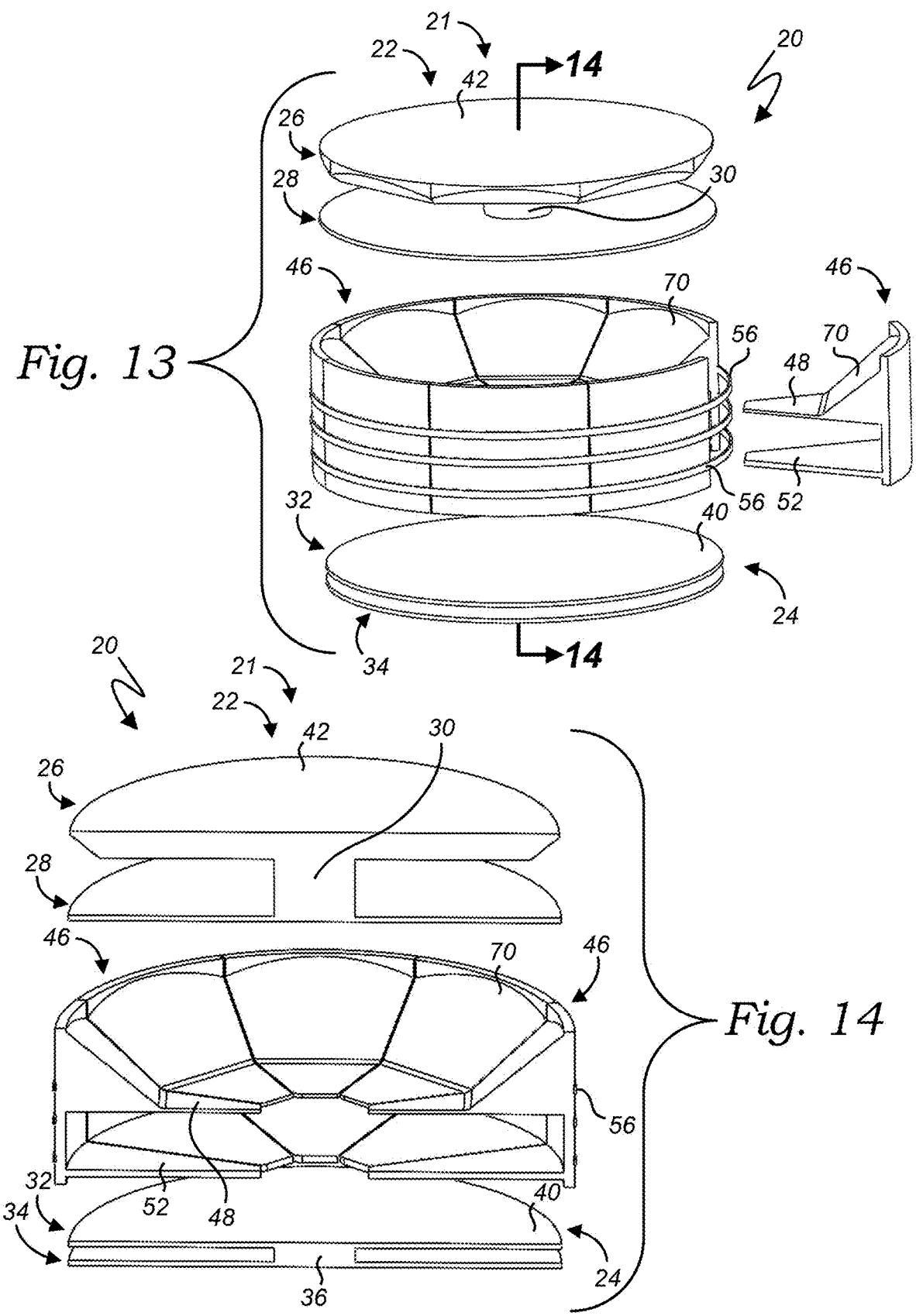

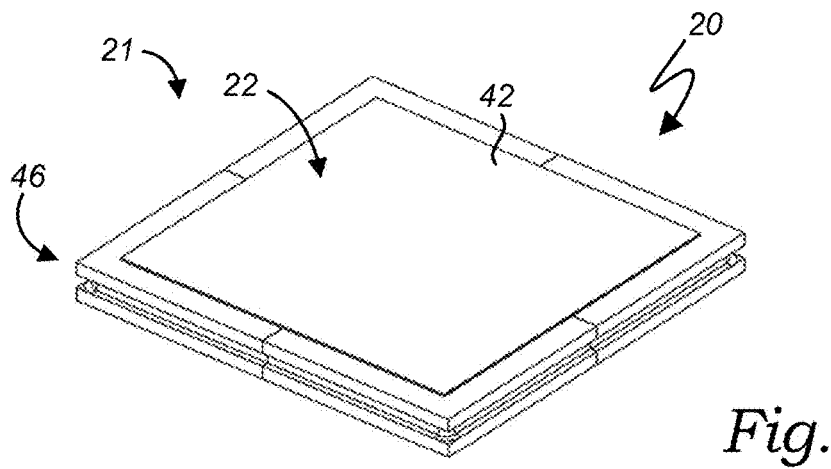
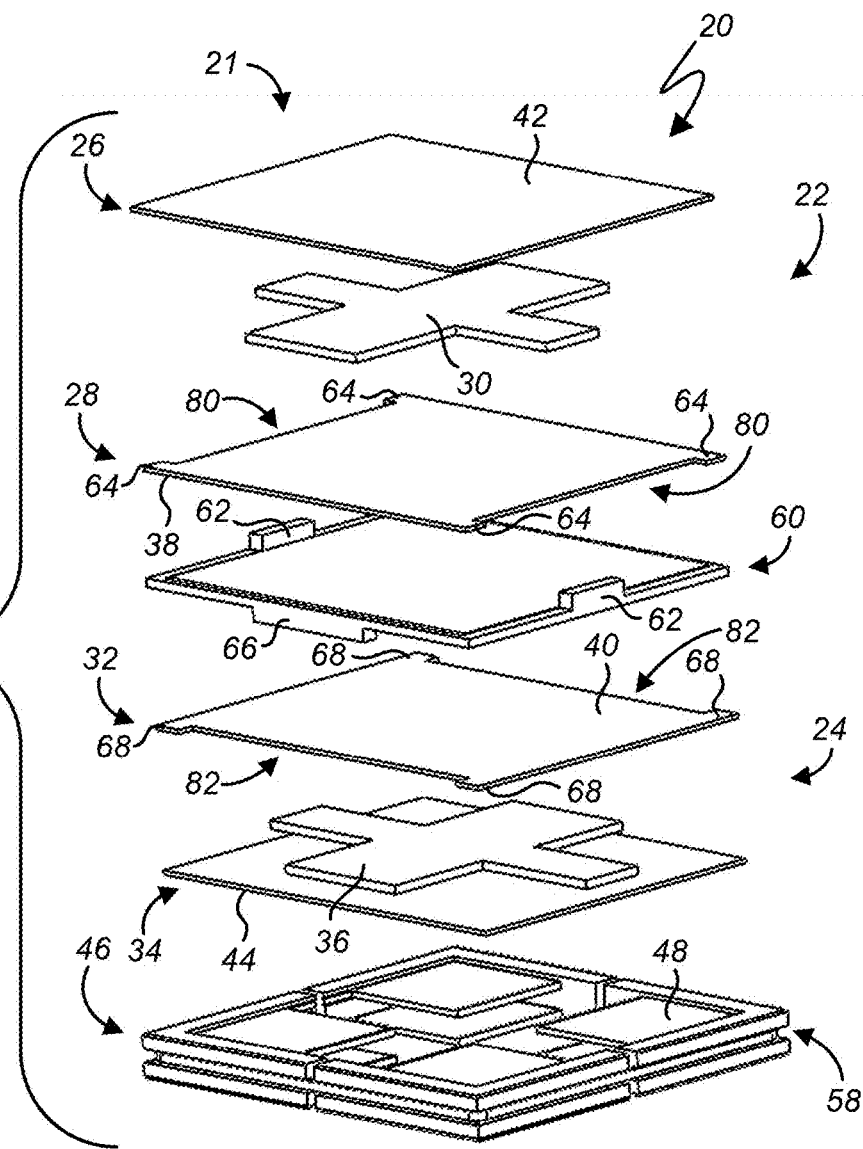
Fig. 16
Fig. 17

SHAPE-MORPHING APPARATUS FOR SHOCK AND VIBRATION PROTECTION

RELATED APPLICATIONS

This application claims priority and is entitled to the filing date of U.S. provisional application Ser. No. 63/472,656, filed on Jun. 13, 2023. The contents of the aforementioned application are incorporated herein by reference.

GOVERNMENT LICENSE RIGHTS

This invention was made with U.S. government support under Grant No. 1927071, awarded by the National Science Foundation (NSF). The U.S. government has certain rights in this invention.

BACKGROUND

The subject of this patent application relates generally to systems and methods for providing shock and vibration protection, and more particularly to a shape-morphing apparatus for reducing the transmission of vibrational forces between a vibration source and an at least one object.

Applicant hereby incorporates herein by reference any and all patents and published patent applications cited or referred to in this application.

By way of background, the conventional way of protecting objects against shock and vibrations involves the use of large volumes of carbon-intensive materials such as foam, rubber or steel. Adding dampening materials, hardening structures and reinforcement in vehicles, IT equipment, vibrating machinery, civil structures, personal protective equipment, leads to solutions that are cumbersome, heavy, and voluminous. In high-level shock and vibration environments, these conventional systems are designed to experience extensive damage to protect the object. In more severe and complex dynamic environments, higher levels of protection are necessary. For example, spacecraft experiencing different dynamic loads during launch and operations, or buildings and high-performance equipment enduring seismic excitations and other severe dynamic loads.

A higher level of protection can be achieved through structural vibration control. Vibration isolation devices are installed to modify the system's dynamic performance and attract and absorb damaging vibration energy, preventing it from affecting target objects.

Vibration control techniques are instrumental in effectively reducing the size and weight of target objects by minimizing the dynamic load applied to them. This results in an improved vibration environment, which has significant benefits in various applications. For example, in space applications, lighter satellites and sensitive equipment substantially lower launch costs. In other applications, reducing the structural mass of the object improves reliability and lowers energy consumption.

High-performance vibration control techniques, like active control, rely on actuators and sensors to measure and adjust structural behavior in real time. However, they require significant computing power, external energy sources, and control components. Passive methods provide similar isolation performance without these requirements, using mechanical anisotropic systems with different stiffness, strength, and energy dissipation in the various directions of the vibration.

Specifically, to decouple an object from its vibration source, a passive vibration isolator requires high stiffness in one direction for load-bearing capability combined with high deformability in another direction to disconnect the object from the vibration source at large displacements. However, existing materials and systems may become instable and cannot maintain stability under compressive and tensile loads when experiencing large deformations, leading to failure and tradeoffs. For example, increasing the height of elastomeric isolators to enable large lateral displacement can reduce stability and stiffness in the vertical direction necessitating an increase in the size of the isolators, which might offsets the benefits of an improved vibration environment, meaning reduced mass and weight of the target object.

In all the micro-vibration applications where the isolation layer is applied to the vibration-sensitive components rather than the whole structure, the increased weight and volume added to the system and the lack of design flexibility represent a major challenge. Recent use of anisotropic metamaterials—meaning engineered materials with different properties controlled by their structures in the different directions of the vibration—advantageously provides a new design degree of freedom for the vibration control system. However, challenges such as elevated stresses and structural instabilities remain when large deformation and energy dissipation are needed. These limitations restrict the effectiveness of the protection for emerging technologies such as sensors, telescopes, cameras, optical satellites, laser communication devices, and IT equipment that demand stringent stability requirements.

Accordingly, there remains a critical need for an advanced system that provides shock and vibration protection while maintaining continuous load-bearing capacity, even when experiencing significant deformations, without significantly increasing the system's weight and volume. Aspects of the present invention fulfill these needs and provide further related advantages as described in the following summary.

It should be noted that the above background description includes information that may be useful in understanding aspects of the present invention. It is not an admission that any of the information provided herein is prior art or relevant to the presently claimed invention, or that any publication specifically or implicitly referenced is prior art.

SUMMARY

Aspects of the present invention teach certain benefits in construction and use which give rise to the exemplary advantages described below.

The present invention solves the problems of protecting an object from impacts and vibration by providing a shape-morphing apparatus for reducing the transmission of vibrational forces between a vibration source and an at least one object, while remaining relatively lightweight, compact, and cost-effective. Importantly, by morphing its shape, the apparatus can maintain continuous load-bearing capability even when subjected to large deformations. In at least one embodiment, a first composite layer provides a first upper plate and a vertically spaced apart first lower plate connected with the first upper plate. A second composite layer provides a second upper plate and a vertically spaced apart second lower plate connected with the second upper plate. An upper surface of the first upper plate is positionable in direct or indirect abutting contact with the at least one object. A lower surface of the second lower plate is positionable in direct or indirect abutting contact with the vibration source. A lower surface of the first lower plate is in direct or indirect sliding abutting contact with an upper surface of the second upper plate, such that the first composite layer is capable of selectively sliding laterally in an at least one direction relative to and parallel with the second composite layer. The lower surface of the first lower plate and upper surface of the second upper plate are held in direct or indirect sliding abutting contact by at least two laterally opposing and laterally oriented U-shaped clips. The at least two clips are interconnected with one another by an at least one resilient retainer positioned and configured for biasing the clips—and, in turn, the first composite layer and second composite layer—into a neutral position, wherein a center of the first composite layer is substantially linearly aligned with a center of the second composite layer.

In one aspect, the present invention works in a vibration environment as a shape-morphing isolation apparatus. When the apparatus is placed between the object and the vibration source, it reduces the transmission of the vibration forces while changing its shape to provide continuous support to the target object and ensure stability even at large deformations. When the apparatus is positioned between two sources of vibration, it reduces the transmission of vibration forces while maintaining the relative distance between the sources.

Accordingly, in at least one embodiment, the apparatus is configured for functioning as a vibration isolation and dampening layer system that reduces the transmission of vibrational and impact forces between a vibration or impact source and an at least one object. In other words, in at least one embodiment, the apparatus is an expandable layer capable of expanding in response to a dynamic excitation while being relatively lightweight and compact in shape and maintaining stability under compressive and tensile loads from the supporting object. Thus, in such embodiments, the apparatus provides a practical cost-effective solution that can provide a high level of vibration protection in a thin combination of components.

In another aspect, the present invention relates to a shape-morphing apparatus with tunable stiffness and additional energy damping. The proposed shape-morphing apparatus extends beyond vibration control and can be effectively applied in diverse working environments to overcome limitations related to materials and systems where achieving sufficient load-bearing capability along with large deformation is not possible.

In another aspect, the apparatus can transform its shape according to its working environment to support the load in multiple deformable configurations with different stiffnesses in different directions and additional energy damping. In general, in other embodiments, the apparatus can undergo significant displacement in one or more directions while still being able to bear a load in other directions. The shape transformations in response to mechanical forces are achieved through a rigid-flexible morphing concept, where rigid mechanical elements (i.e. composite layers and clips), slide and deform flexible elements. The flexible elements enable the apparatus to morph reversibly. Using multiple rigid mechanical elements, such as clips, increases the in-plane degree of deformability of the apparatus. Furthermore, variations in the geometry of the rigid mechanical elements increase the out-of-the-plane deformability modes of the apparatus.

In another aspect, the present invention relates to a shape-morphing metamaterial apparatus with tunable stiffness and additional energy damping. The assembly of unit cells into a shape-morphing metamaterial allows the creation of a complex morphing mechanism to protect objects with complex geometry under different directions of vibration. For illustrative purposes, a shape-morphing metamaterial is referred to herein as a "cell layer."

Other features and advantages of aspects of the present invention will become apparent from the following more detailed description, taken in conjunction with the accompanying drawings, which illustrate, by way of example, the principles of aspects of the invention.

BRIEF DESCRIPTION OF THE DRAWINGS

The accompanying drawings illustrate aspects of the present invention. In such drawings:

FIG. 13 is an exploded view of the apparatus of FIG. 12, in accordance with at least one embodiment;

FIG. 14 is a cross-sectional view taken along line 14-14 of FIG. 13;

FIG. 16 is a perspective view of a still further exemplary shape-morphing apparatus, in accordance with at least one embodiment;

FIG. 17 is an exploded view of the apparatus of FIG. 16, in accordance with at least one embodiment

The above-described drawing figures illustrate aspects of the invention in at least one of its exemplary embodiments, which are further defined in detail in the following description. Features, elements, and aspects of the invention that are referenced by the same numerals in different figures represent the same, equivalent, or similar features, elements, or aspects, in accordance with one or more embodiments.

DETAILED DESCRIPTION

Figure 1:
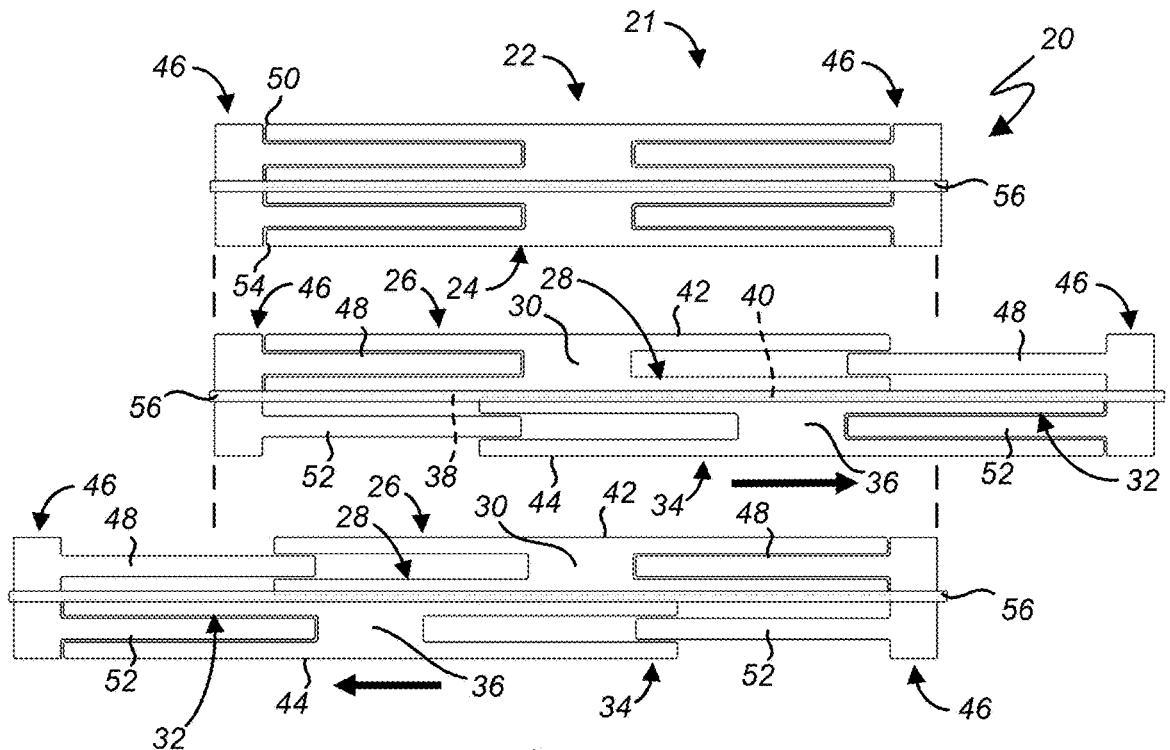
FIG. 1 is a side elevational diagram of an exemplary shape-morphing apparatus, in accordance with at least one embodiment.

Turning now to FIG. 1, there is shown a side elevational diagram of an exemplary shape-morphing apparatus 20, in accordance with at least one embodiment, configured for functioning as a shock and/or vibration (hereinafter collectively referred to as "vibration" for simplicity purposes) isolation and dampening layer that reduces or eliminates the transmission of vibration from a vibrating surface or other vibration and impact source (hereinafter collectively referred to as a "vibration source" for simplicity purposes) to an at least one object. The object may be any type of object, now known or later developed, that could benefit from being protected from vibrational forces, including but in no way limited to people, cargo, satellites, batteries, IT equipment, electronic equipment, avionics equipment, buildings, etc. Accordingly, while the apparatus 20 may be shown and described herein in the context of certain types of objects and/or use cases for illustrative purposes, the apparatus 20 should not be read as being so limited. The efficient design of vibration isolation is beneficial for reducing material consumption, fully protecting the vibration targets, and extending their lifespan. The ability of an isolation layer to transform its shape is an attractive solution where the layer can expand and/or adapt its shape to support the load during large displacement. Additionally, the shape transformations of the apparatus 20 allows for achieving different stiffnesses in different directions and provides additional energy damping.

Figure 21:
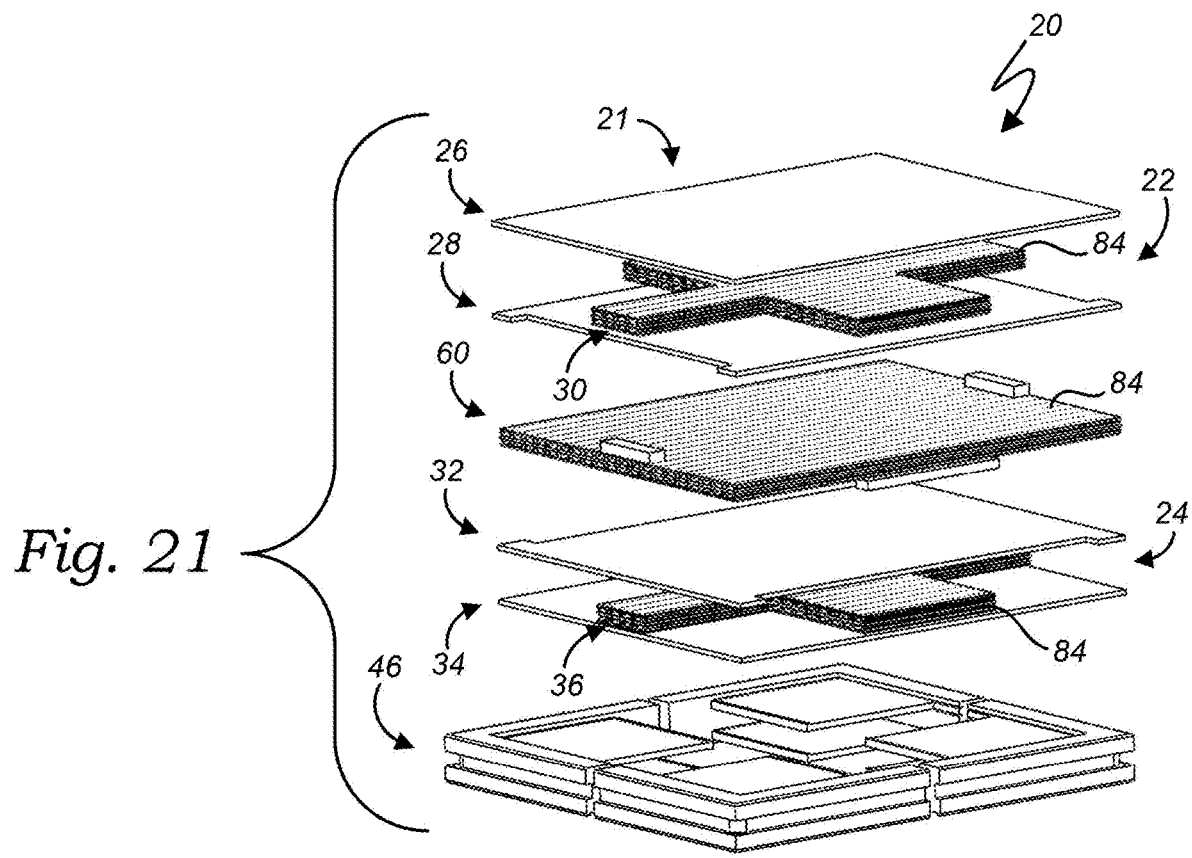
FIG. 21 is an exploded view of a still further exemplary shape-morphing apparatus, in accordance with at least one embodiment.

In at least one embodiment, the apparatus 20 comprises an at least one unit cell 21 that itself provides a first composite layer 22 and a second composite layer 24 in sliding abutting contact with the first composite layer 22. In at least one embodiment, the sliding abutting contact between the first composite layer 22 and a second composite layer 24 is achieved through use of low-friction materials or coatings. In at least one alternate embodiment, the sliding abutting contact between the first composite layer 22 and a second composite layer 24 is achieved through use of rollers or bearings. In still further alternate embodiments, the sliding abutting contact between the first composite layer 22 and a second composite layer 24 is achieved through use of any other mechanism, structure or material, now known or later developed. In at least one embodiment, the first composite layer 22 provides a first upper plate 26 and a vertically spaced apart first lower plate 28 connected with the first upper plate 26. In at least one embodiment, an at least one first connector 30 interconnects and extends between a center of the first upper plate 26 and a center of the first lower plate 28. In at least one embodiment, the at least one first connector 30 is a pin; however, in further embodiments, the at least one first connector 30 may be any other mechanism, structure or material, now known or later developed, capable of connecting the first upper plate 26 and first lower plate 28. Similarly, in at least one embodiment, the second composite layer 24 provides a second upper plate 32 and a vertically spaced apart second lower plate 34 connected with the second upper plate 32. In at least one embodiment, an at least one second connector 36 interconnects and extends between a center of the second upper plate 32 and a center of the second lower plate 34. In at least one embodiment, the at least one second connector 36 is a pin; however, in further embodiments, the at least one second connector 36 may be any other mechanism, structure or material, now known or later developed, capable of connecting the second upper plate 32 and second lower plate 34. In at least one embodiment, the at least one first connector 30 is constructed out of a resilient, deformable material in order to allow for minimal deformation between first upper plate 26 and first lower plate 28. Similarly, in at least one embodiment, the at least one second connector 36 is constructed out of a resilient, deformable material in order to allow for minimal deformation between second upper plate 32 and second lower plate 34. In at least one such embodiment, as illustrated in FIG. 21, the at least one first connector 30 and/or the at least one second connector 36 is constructed out of a vibration absorbing metamaterial 84 similar to the vibration absorbing metamaterial apparatus described in Applicant's U.S. Pat. No. 11,300,176, the contents of which are incorporated herein by reference. In at least one further alternate embodiment, the at least one first connector 30 and/or the at least one second connector 36 may be constructed out of other energy absorption metamaterials, now known or later developed.

In at least one embodiment, with continued reference to FIG. 1, a lower surface 38 of the first lower plate 28 is in sliding abutting contact with an upper surface 40 of the second upper plate 32, such that the first composite layer 22 is capable of selectively sliding in at least one direction relative to and parallel with the second composite layer 24, as discussed further below. Additionally, in at least one embodiment, an upper surface 42 of the first upper plate 26 is positioned in direct or indirect abutting contact with the object to be protected, while a lower surface 44 of the second lower plate 34 is positioned in direct or indirect abutting contact with the vibration source. In at least one alternate embodiment, depending on the orientation of the apparatus 20 relative to the object and vibration source, the upper surface 42 of the first upper plate 26 is positioned in direct or indirect abutting contact with the vibration source, while the lower surface 44 of the second lower plate 34 is positioned in direct or indirect abutting contact with the object to be protected. Accordingly, while directional terms are used herein for illustrative purposes, they are not necessarily indicative of a specific orientation of the apparatus 20. In other words, the apparatus 20 may be utilized in any number of orientations, dependent at least in part on the specific object to be protected from a given vibration source. Thus, the apparatus 20 should not be read as being limited to any one specific orientation.

In at least one embodiment, the first composite layer 22 and second composite layer 24 are held in sliding abutting contact by at least two laterally opposing and laterally oriented U-shaped clips 46 or pins (hereinafter referred to as "clips" for simplicity purposes). In at least one such embodiment, a first arm 48 of each clip 46 is slidably positioned between the first upper plate 26 and the first lower plate 28 along a lateral edge 50 of the first composite layer 22, while a second arm 52 of each clip 46 is slidably positioned between the second upper plate 32 and second lower plate 34 along a lateral edge 54 of the second composite layer 24, such that the first lower plate 28 and second upper plate 32 are positioned between the first and second arms 48 and 52 of each clip 46. Accordingly, in such embodiments, the clips 46 are configured for maintaining sliding abutting contact between the lower surface 38 of the first lower plate 28 and the upper surface 40 of the second upper plate 32. Additionally, in at least one embodiment, the clips 46 assist in preventing any relative vertical displacements between the first composite layer 22 and second composite layer 24, while also providing a tensile and compressive restraint for vertical movement while the first composite layer 22 and second composite layer 24 are laterally sliding relative to one another. In at least one alternate embodiment, the clips 46 may take on any other sizes, shapes, dimensions, quantities and/or relative positions, now known or later developed, or may even comprise any other mechanism, structure or material, now known or later developed, capable of maintaining sliding abutting contact between the lower surface 38 of the first lower plate 28 and the upper surface 40 of the second upper plate 32. In that regard, the apparatus 20 might be designed to adapt its stiffness and energy dissipation in different directions by changing one or more of the sizes, shapes, dimensions, quantities and/or relative positions of the clips 46. Additional design parameters for the optimization include (but are in no way limited to): distance between one or more of the first upper plate 26, first lower plate 28, second upper plate 32, second lower plate 34, first arm 48 and second arm 52, orientation of the first and second arms 48 and 52 of each clip 46, friction coefficient of the contact surfaces, etc. The stiffness in the lateral and longitudinal direction of the plane can be optimized to achieve an optimal isolation performance.

Figure 2:
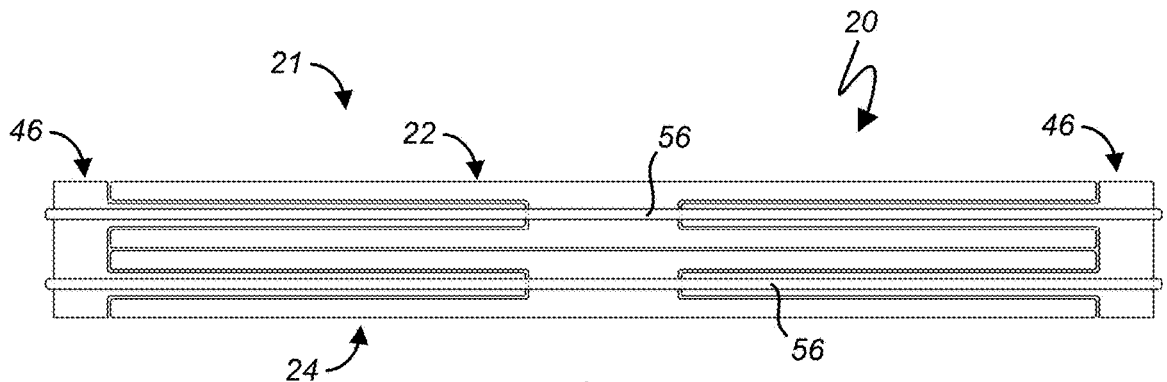
FIG. 2 is a side elevational view of a further exemplary shape-morphing apparatus, in accordance with at least one embodiment.
Figure 8:
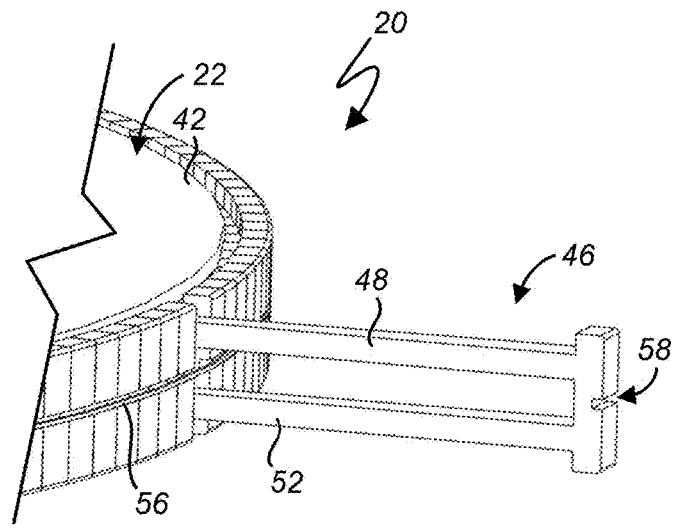
FIG. 8 is a partial perspective view of the apparatus of FIG. 7, in accordance with at least one embodiment.
Figure 29:
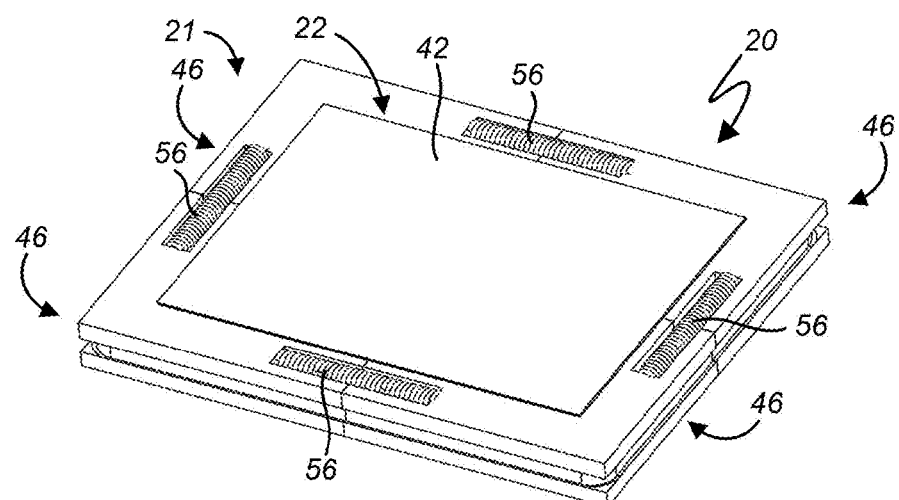
FIG. 29 is a perspective view of a still further exemplary shape-morphing apparatus, in accordance with at least one embodiment.

In at least one embodiment, the at least two laterally opposing and laterally oriented clips 46 are interconnected with one another by an at least one resilient retainer 56 positioned and configured for biasing the clips 46—and, in turn, the first composite layer 22 and second composite layer 24—into a neutral position, wherein a center of the first composite layer 22 is substantially linearly aligned with a center of the second composite layer 24 and each of the clips 46 is moved fully inwardly toward an imaginary vertical midline of the apparatus 20 so as to be in substantial abutting contact with the lateral edges 50 and 54 of the first composite layer 22 and second composite layer 24. Accordingly, in at least one embodiment, in addition to the clips 46 being configured for maintaining sliding abutting contact between the lower surface 38 of the first lower plate 28 and the upper surface 40 of the second upper plate 32, the clips 46 are further configured for biasing the first composite layer 22 and second composite layer 24 (via the at least one retainer 56) into the neutral position. Additionally, the clips 46 provide a continuous support to the first composite layer 22 and second composite layer 24 so as to avoid the risk of any instability during large displacements. In at least one embodiment, the at least one retainer 56 is an elongate elastic band (such as a rubber band, for example) extending about a perimeter of the first composite layer 22 and second composite layer 24. In at least one such embodiment, as best illustrated in FIG. 8, each of the clips 46 provides an at least one retainer groove 58 sized and configured for receiving the at least one retainer 56 therewithin so as to maintain a proper position of the at least one retainer 56 relative to the clips 46. In at least one further embodiment, as illustrated in FIG. 2, the apparatus 20 provides two retainers 56. In at least one alternate embodiment, as illustrated in FIG. 29, the at least one retainer 56 is an extension spring secured between two or more clips 46. In at least one alternate embodiment, two compression springs are placed in two perpendicular directions. In still further alternate embodiments, the at least one retainer 56 may take on any other sizes, shapes, dimensions, quantities and/or relative positions, now known or later developed, or may even comprise any other mechanism, structure or material, now known or later developed, capable of biasing the first composite layer 22 and second composite layer 24 into the neutral position.

Accordingly, as illustrated in FIG. 1, with the lower surface 44 of the second lower plate 34 positioned in direct or indirect abutting contact with the vibration source and the upper surface 42 of the first upper plate 26 positioned in direct or indirect abutting contact with the object to be protected, when a vibration occurs, the second composite layer 24 undergoes the displacement and force the corresponding clip(s) 46 to slide. In at least one embodiment, the clips 46 provide continuous load-bearing capability during the sliding to prevent stability issues even at large displacement. Without the bearing capability provided by the clips 46, the apparatus 20 would experience a significant reduction in stiffness in the direction perpendicular to the plate and/or an overturning rotational effect between the first composite layer 22 and second composite layer 24. The clips 46 also assist to control the vertical stiffness of the apparatus 20. Their sliding, with the first composite layer 22 or second composite layer 24, depending on the direction of the vibration, ensures high stiffness in the vertical direction, even at large displacement. Additionally, the shape and number of clips 46 as described below allow for controlling stiffness and energy dissipation in different directions.

In at least one embodiment, with continued reference to FIG. 1, the apparatus 20 has a symmetrical configuration where the vibration source can be applied to the lower surface 44 of the second lower plate 34 or to the upper surface 42 of the first upper plate 26, or both. An example of the first load configuration is when (with the apparatus 20 positioned in a substantially horizontal orientation) the vibration source is the ground shaking and the object to be protected is placed on top of the upper surface 42 of the first upper plate 26. In this configuration, the expandable layers (i.e., the laterally sliding first composite layer 22 and second composite layer 24) of the apparatus 20 can be optimized to have high lateral flexibility and large lateral displacement while maintaining stability under the vertical load of the object. In a different configuration, the expandable layers of the apparatus 20 can be oriented vertically or with different orientations.

Figure 3:
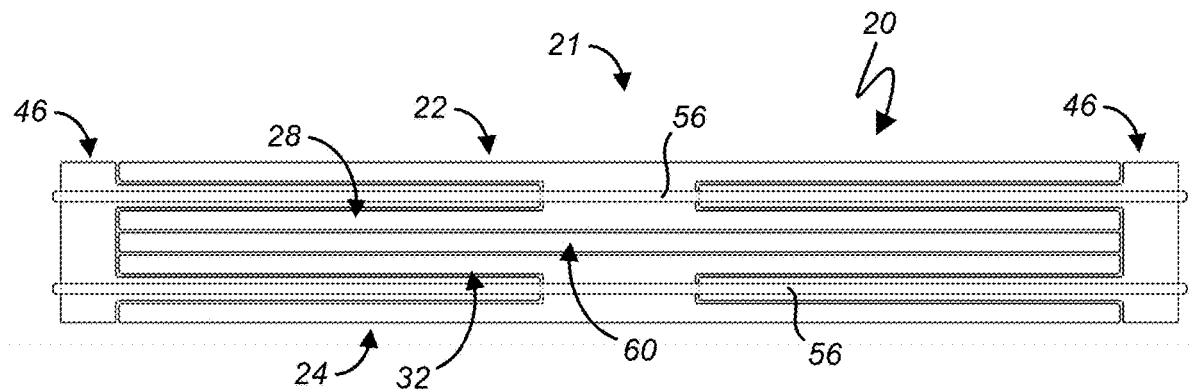
FIG. 3 is a side elevational view of a still further exemplary shape-morphing apparatus, in accordance with at least one embodiment.
Figure 4:
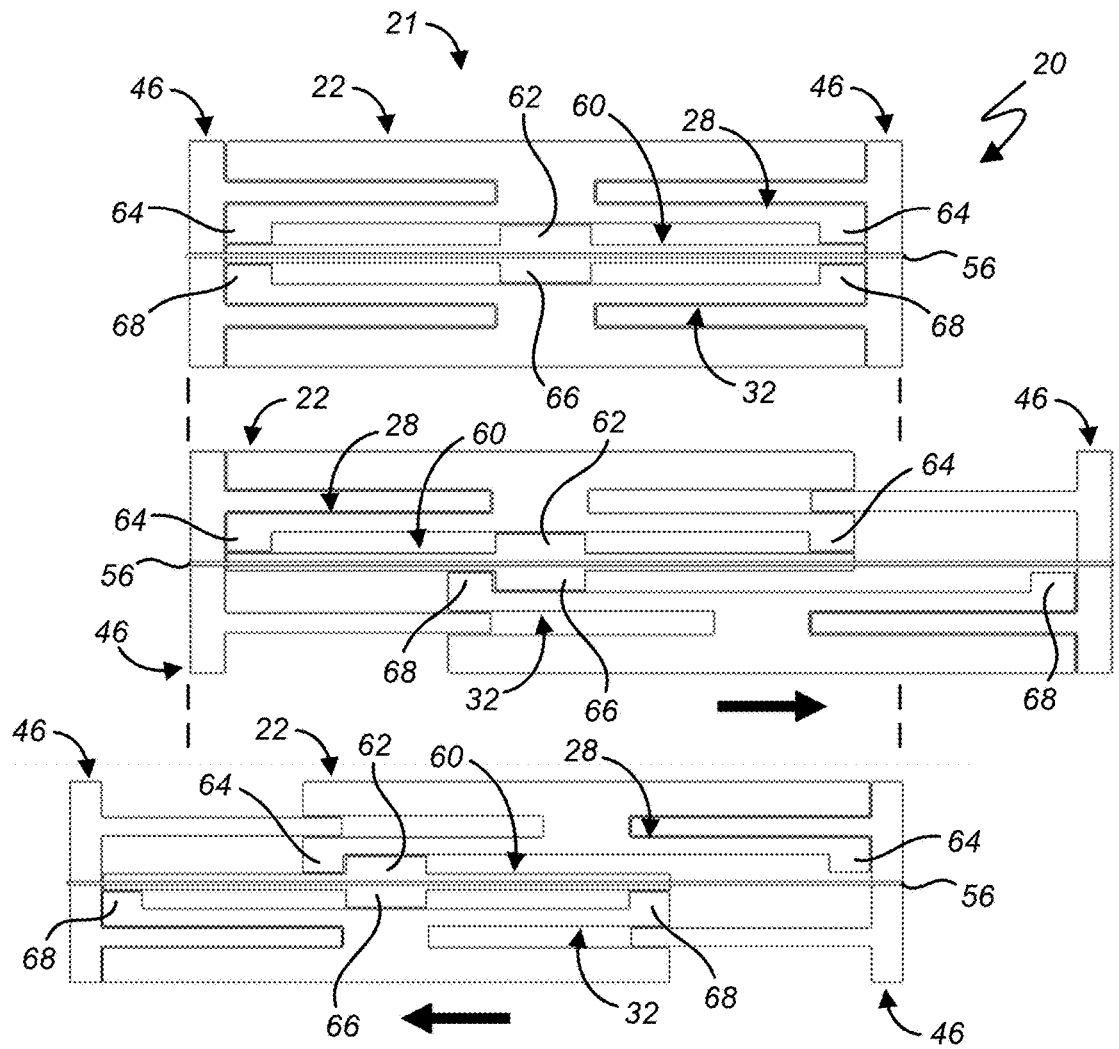
FIG. 4 is a side elevational view of a still further exemplary shape-morphing apparatus, in accordance with at least one embodiment.

In at least one embodiment, as illustrated in FIG. 3, the at least one unit cell 21 of the apparatus 20 provides an at least one intermediate plate 60 positioned in sliding abutting contact between the lower surface 38 of the first lower plate 28 and the upper surface 40 of the second upper plate 32 for facilitating and optimizing the lateral sliding movements between the first composite layer 22 and second composite layer 24, while also decomposing any arbitrary displacement into pre-defined components. In at least one embodiment the at least one intermediate plate 60 is further configured for controlling the relative lateral displacement of the first composite layer 22 and second composite layer 24. In at least one such embodiment, as illustrated in FIG. 4, the intermediate plate 60 provides an at least one first stop 62 positioned and configured for selectively contacting a corresponding at least one first catch 64 provided by the lower surface 38 of the first lower plate 28, thereby limiting a displacement distance by which the first composite layer 22 is able to laterally slide relative to the second composite layer 24. Similarly, in at least one such embodiment, the intermediate plate 60 provides an at least one second stop 66 positioned and configured for selectively contacting a corresponding at least one second catch 68 provided by the upper surface 40 of the second upper plate 32, thereby limiting a displacement distance by which the second composite layer 24 is able to laterally slide relative to the first composite layer 22. In further alternate embodiments, each of the at least one first stop 62 and second stop 66 may take on any other sizes, shapes, dimensions, quantities and/or relative positions, now known or later developed, or may even comprise any other mechanism, structure or material, now known or later developed, capable of limiting the relative lateral displacement of the first composite layer 22 and second composite layer 24.

Figure 18:
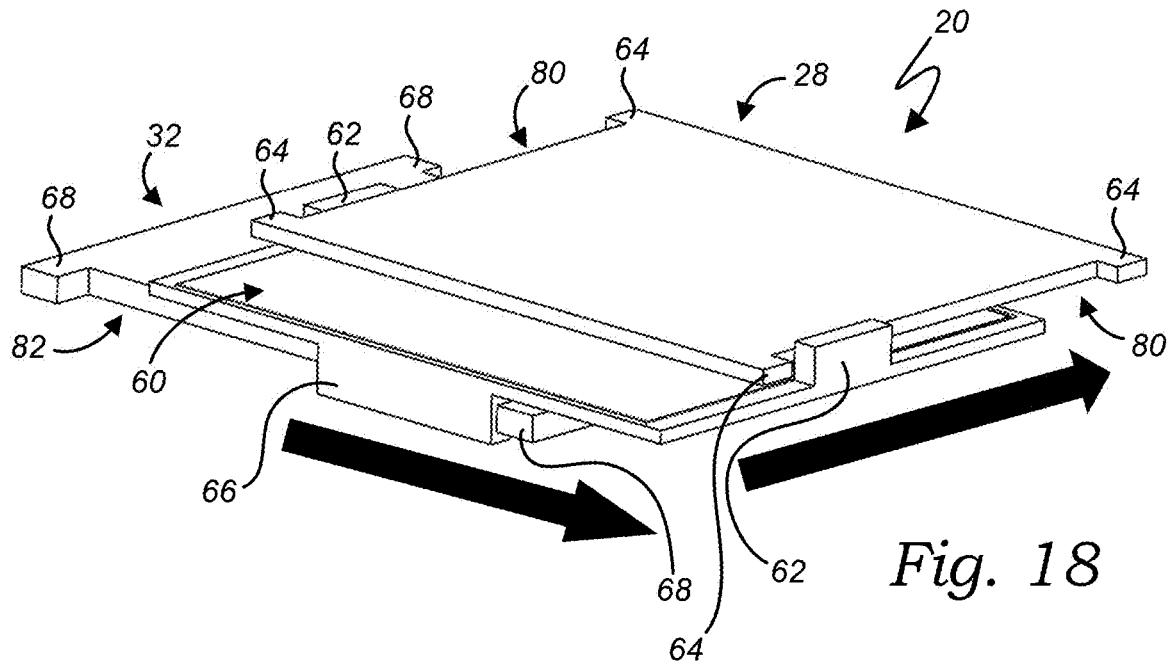
FIG. 18 is a perspective diagram of the apparatus of FIG. 16, in accordance with at least one embodiment, showing only a first lower plate, an intermediate plate, and a second upper plate of the apparatus for clarity.

In at least one such alternate embodiment, as illustrated in FIG. 17, the first lower plate 28 provides at least one pair of spaced apart first catches 62 positioned along an edge of the first lower plate 28 and cooperating to form a linear first guide 80 therebetween. The first guide 80 is sized and configured for slidable engagement with a corresponding first stop 62 of the intermediate plate 60, thereby allowing the first stop 62 to ride within the first guide 80 and limiting a displacement distance by which the first composite layer 22 is able to laterally slide relative to the second composite layer 24, as illustrated in FIG. 18. In at least one embodiment, the first lower plate 28 provides two pairs of spaced apart first catches 62 defining a pair of first guides 80 positioned along laterally opposing edges of the first lower plate 28 and configured for slidable engagement with a pair of corresponding laterally opposed first stops 62 provided by the intermediate plate 60. Similarly, in at least one embodiment, with continued reference to FIG. 18, the second upper plate 32 provides at least one pair of spaced apart second catches 68 positioned along an edge of the second upper plate 32 and cooperating to form a linear second guide 82 therebetween. The second guide 82 is sized and configured for slidable engagement with a corresponding second stop 66 of the intermediate plate 60, thereby allowing the second stop 66 to ride within the second guide 82 and limiting a displacement distance by which the second composite layer 24 is able to laterally slide relative to the first composite layer 22, as illustrated in FIG. 18. In at least one embodiment, the second upper plate 32 provides two pairs of spaced apart second catches 68 defining a pair of second guides 82 positioned along laterally opposing edges of the second upper plate 32 and configured for slidable engagement with a pair of corresponding laterally opposed second stops 66 provided by the intermediate plate 60. In at least one such embodiment, as illustrated in FIGS. 17 and 18, the lateral edges of the first lower plate 28 on which the pair of first guides 80 are positioned are different than the lateral edges of the second upper plate 32 on which the pair of second guides 82 are positioned, thereby allowing the apparatus 20 to achieve lateral displacements in multiple directions. In further alternate embodiments, each of the at least one first guide 80 and second guide 82 may take on any other sizes, shapes, dimensions, quantities and/or relative positions, now known or later developed, or may even comprise any other mechanism, structure or material, now known or later developed, capable of limiting the relative lateral displacement of the first composite layer 22 and second composite layer 24.

Figure 20:
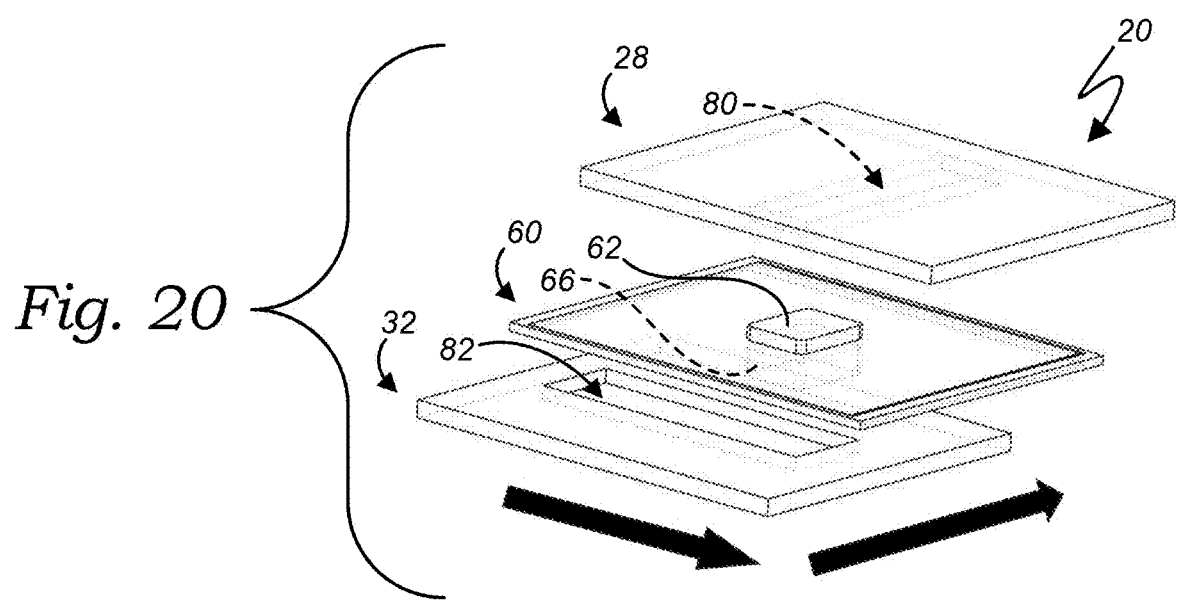
FIG. 20 is an exploded diagram of a still further exemplary shape-morphing apparatus, in accordance with at least one embodiment, showing only a first lower plate, an intermediate plate, and a second upper plate of the apparatus for clarity.

In at least one such alternate embodiment, as illustrated in FIG. 20, the at least one first guide 80 is a recessed slot positioned within the lower surface 38 of the first lower plate 28 and configured for slidably receiving the corresponding at least one first stop 62 of the intermediate plate 60 therewithin. Similarly, in at least one such alternate embodiment, the at least one second guide 82 is a recessed slot positioned within the upper surface 40 of the second upper plate 32 and configured for slidably receiving the corresponding at least one second stop 66 of the intermediate plate 60 therewithin. In at least one such embodiment, the at least one first guide 80 is laterally oriented in a direction substantially transverse to the at least one second guide 82, thereby allowing the apparatus 20 to achieve lateral displacements in multiple directions. In at least one alternate embodiment, the at least one first guide 80 and at least one second guide 82 are each recessed slots positioned on the intermediate plate 60, while the corresponding first stop 62 is positioned on the lower surface 38 of the first lower plate 28 and the corresponding second stop 66 is positioned on the upper surface 40 of the second upper plate 32.

Figure 22:
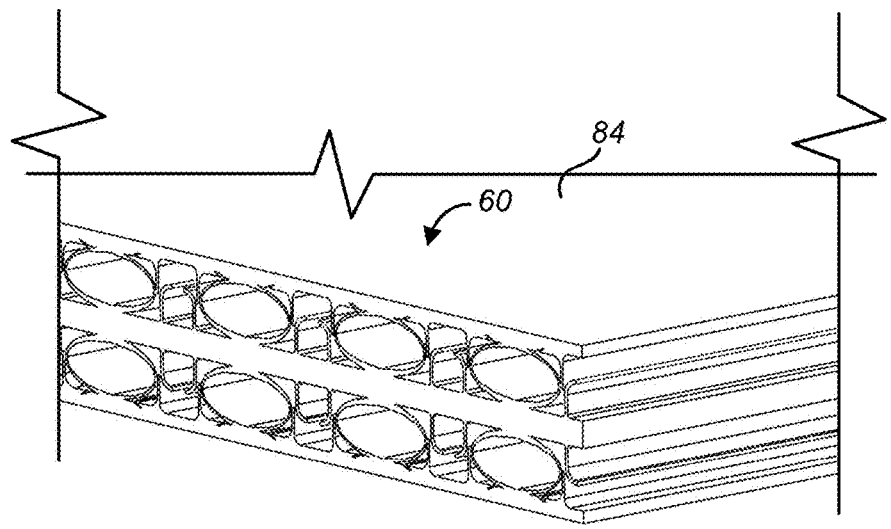
FIG. 22 is a partial perspective view of an intermediate plate of the apparatus of FIG. 21, in accordance with at least one embodiment.
Figure 23:
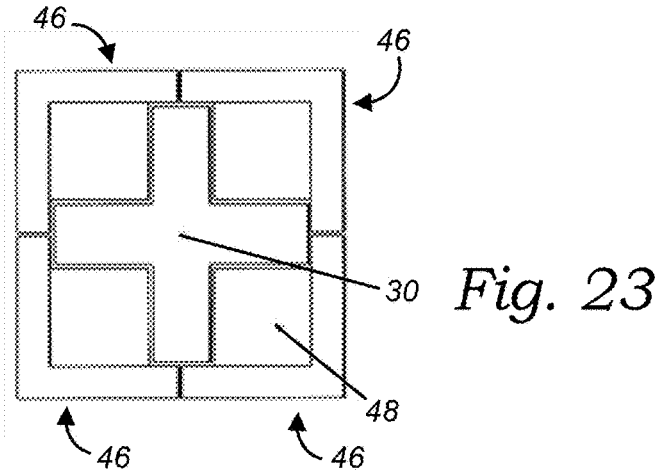
FIGS. 23-27 are top plan views of exemplary first lower plates and corresponding exemplary clips and connectors, in accordance with at least one embodiment.
Figure 24:
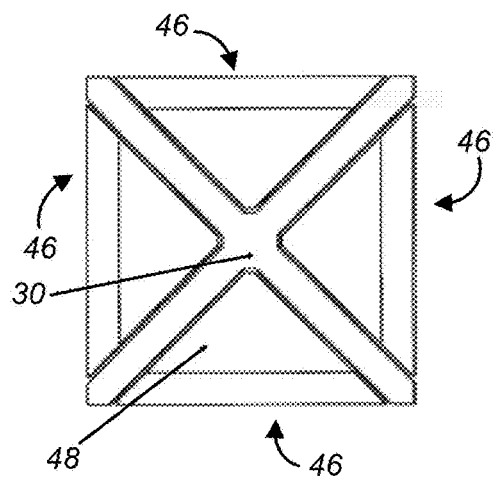
Figure 25:
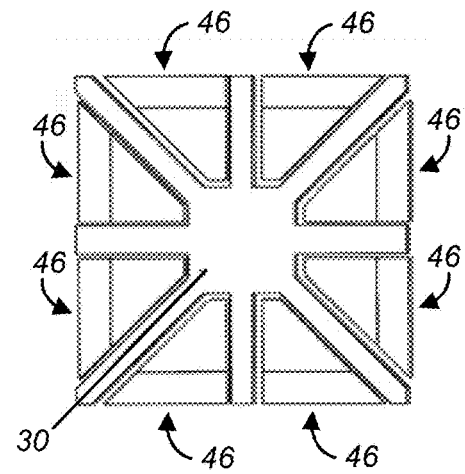

In at least one further alternate embodiment, as illustrated in FIGS. 21 and 22, the intermediate plate 60 is constructed out of a vibration absorbing metamaterial 84 similar to the vibration absorbing metamaterial apparatus described in Applicant's U.S. Pat. No. 11,300,176. In at least one further alternate embodiment, the intermediate plate 60 may be constructed out of other energy absorption metamaterials, now known or later developed.

Figure 5:
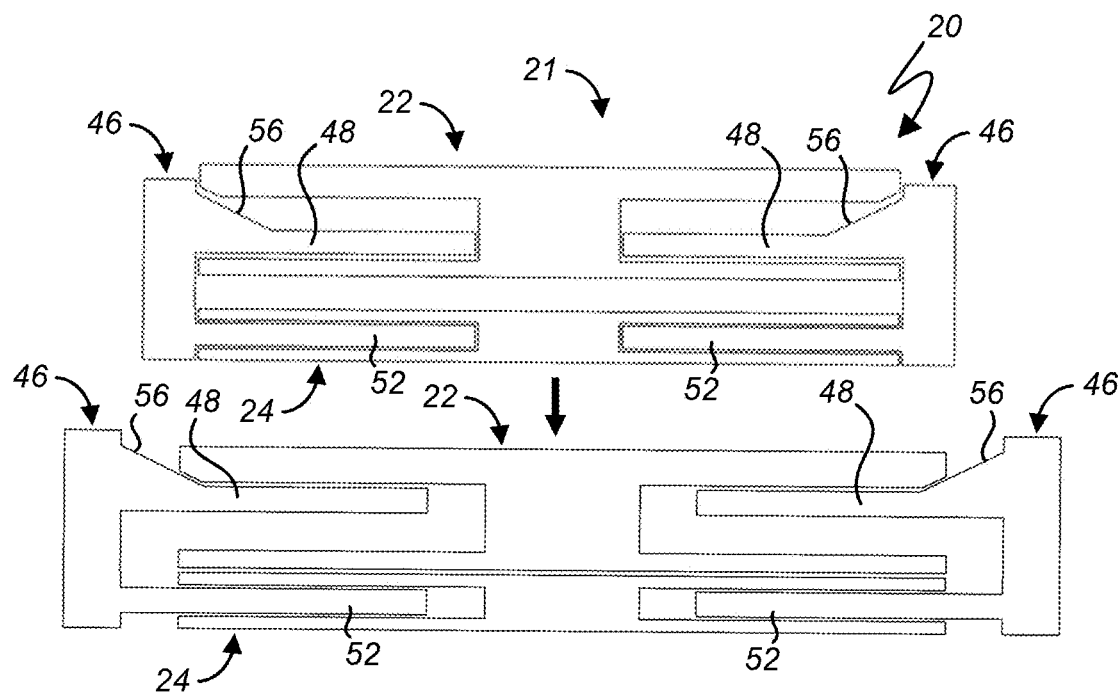
FIG. 5 is a side elevational view of a still further exemplary shape-morphing apparatus, in accordance with at least one embodiment.

In at least one embodiment, as best illustrated in FIG. 1, the first arm 48 of each clip 46 has a thickness that approximates a distance between the first upper plate 26 and the first lower plate 28, so as to minimize or prevent displacement of the first composite layer 22 in a vertical direction (i.e., in a direction substantially perpendicular to the second composite layer 24). Similarly, in at least one embodiment, the second arm 52 of each clip 46 has a thickness that approximates a distance between the second upper plate 32 and the second lower plate 34, so as to minimize or prevent displacement of the second composite layer 24 in a vertical direction. Additionally, in at least one embodiment, the first arm 48 and second arm 52 of each clip 46 is spaced apart such that a distance between the first arm 48 and second arm 52 approximates a combined thickness of the first lower plate 28 and second upper plate 32—again, so as to minimize or prevent displacement of the first composite layer 22 and second composite layer 24 in a vertical direction. In at least one alternate embodiment, the clips 46 are sized and configured for allowing an amount of vertical displacement for one or both of the first composite layer 22 and second composite layer 24. In at least one such alternate embodiment, as illustrated in FIG. 5, the first arm 48 of each clip 46 has a thickness that is less than the distance between the first upper plate 26 and the first lower plate 28, while the distance between the first arm 48 and second arm 52 is greater than the combined thickness of the first lower plate 28 and second upper plate 32, thereby allowing an amount of vertical displacement for the first composite layer 22. In at least one other such alternate embodiment, the second arm 52 of each clip 46 has a thickness that is less than the distance between the second upper plate 32 and the second lower plate 34, while the distance between the first arm 48 and second arm 52 is greater than the combined thickness of the first lower plate 28 and second upper plate 32, thereby allowing an amount of vertical displacement for the second composite layer 24. Accordingly, in such embodiments, the apparatus 20 allows for relative vertical displacements in combination with the lateral displacements in order to create a multidimensional energy dissipation mechanism.

In at least one embodiment, where the clips 46 are configured for allowing an amount of vertical displacement for the first composite layer 22, the first arm 48 of each clip 46 provides a downwardly sloping shoulder portion 70 positioned and configured for assisting in the vertical displacement of the first composite layer 22, and the subsequent biasing of the clips 46 back into the neutral position. Similarly, in at least one embodiment, where the clips 46 are configured for allowing an amount of vertical displacement for the second composite layer 24, the second arm 52 of each clip 46 provides a downwardly sloping shoulder portion 70 positioned and configured for assisting in the vertical displacement of the second composite layer 24, and the subsequent biasing of the clips 46 back into the neutral position. In at least one alternate embodiment, one or more of the shoulder portions 70 may be upwardly sloping instead.

Figure 6:
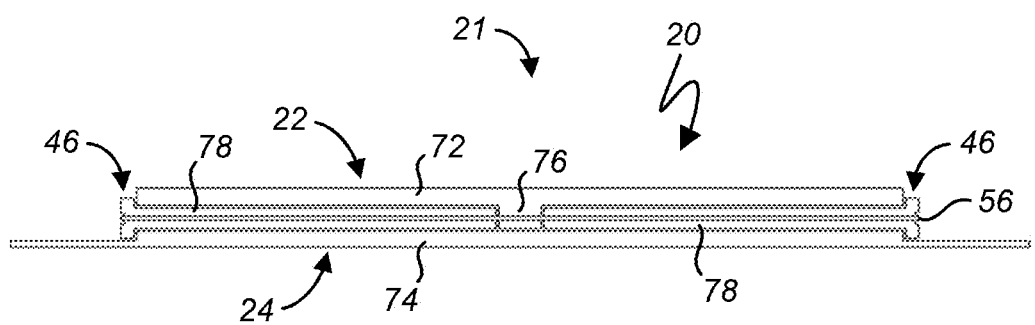
FIG. 6 is a side elevational view of a still further exemplary shape-morphing apparatus, in accordance with at least one embodiment.

A simplified embodiment of the apparatus 20 capable of expanding under dynamic excitation while being very compact in shape and maintaining stability under compression loads (not tensile loads) from the supporting objects is shown in FIG. 6. In at least one such simplified embodiment, the first composite layer 22 provides only a single upper plate 72 and the second composite layer 24 provides only a single lower plate 74 in sliding abutting contact with the upper plate 72 of the first composite layer 22. In at least one such embodiment, the upper plate 72 provides a protrusion 76 (such as a pin, for example) that is in contact with the lower plate 74, thereby creating a space within which an arm 78 of each clip 46 is slidably positioned therebetween.

Figure 7:
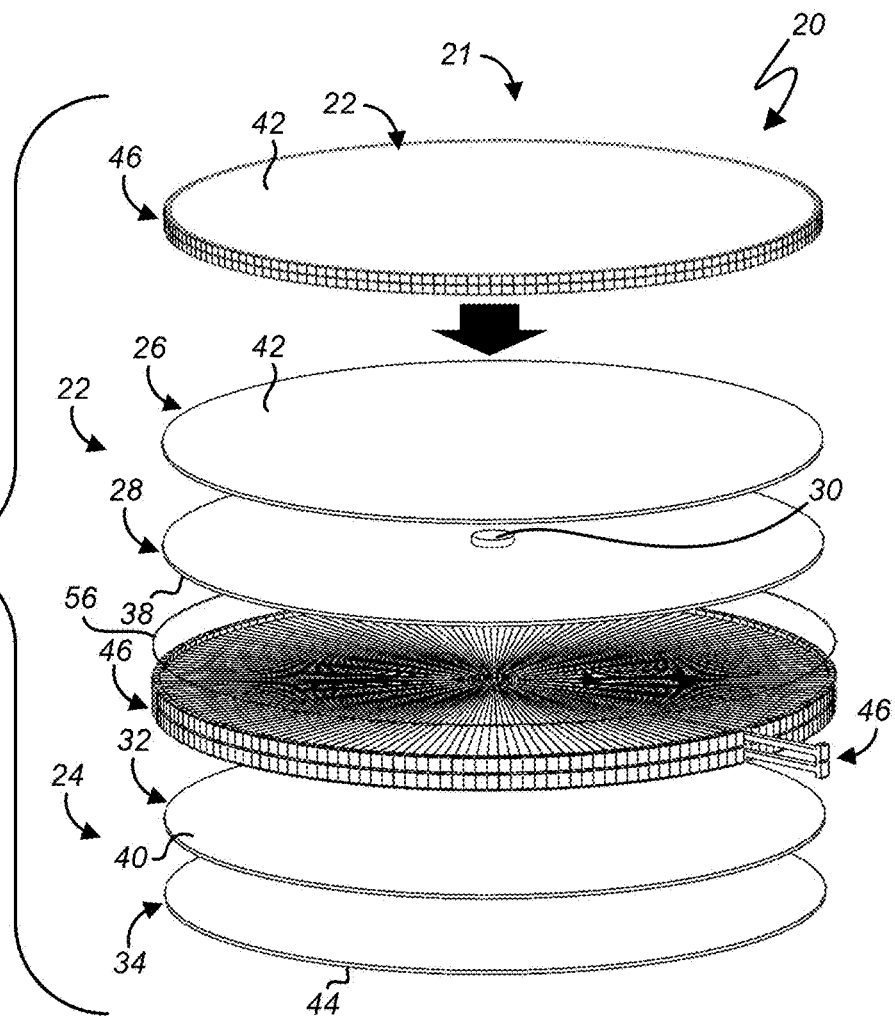
FIG. 7 is an exploded view of a still further exemplary shape-morphing apparatus, in accordance with at least one embodiment.
Figure 9:
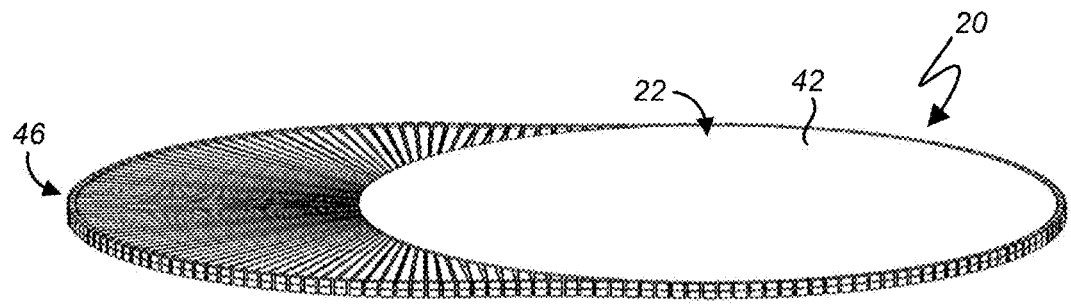
FIG. 9 is a perspective view of the apparatus of FIG. 7, in accordance with at least one embodiment, illustrating an exemplary lateral displacement thereof.
Figure 10:
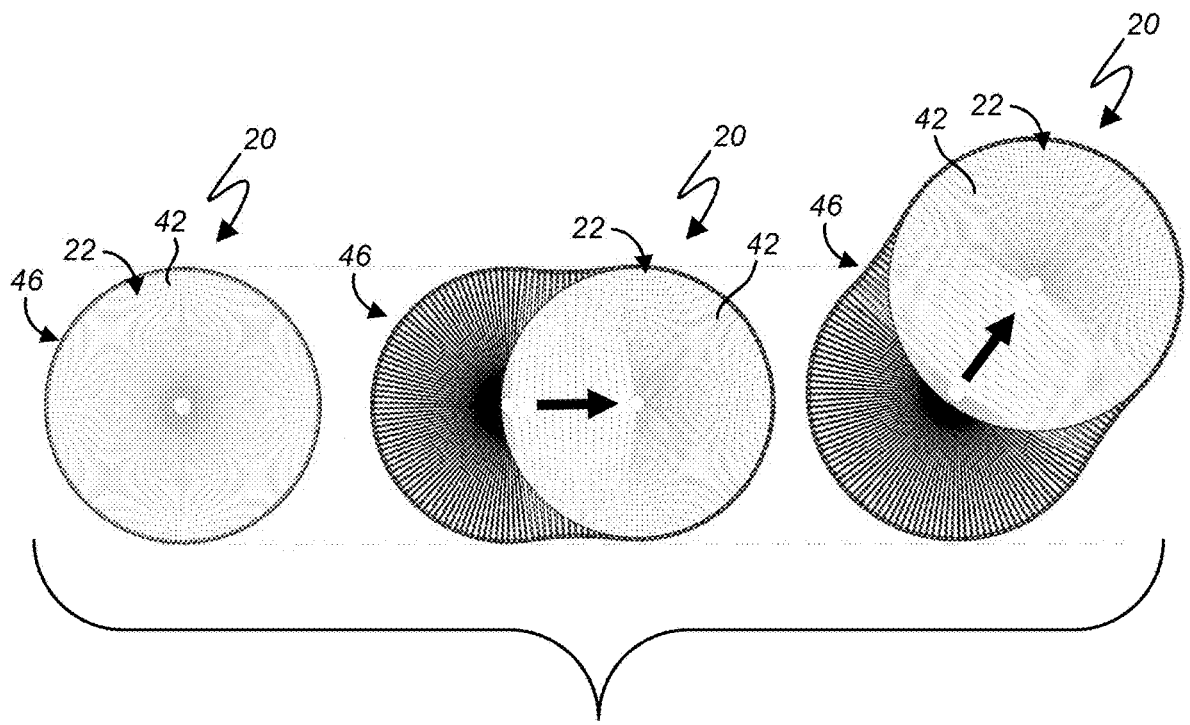
FIGS. 10 and 11 are top plan diagrams of the apparatus, in accordance with at least one embodiment, illustrating further exemplary lateral and vertical displacements thereof.
Figure 11:
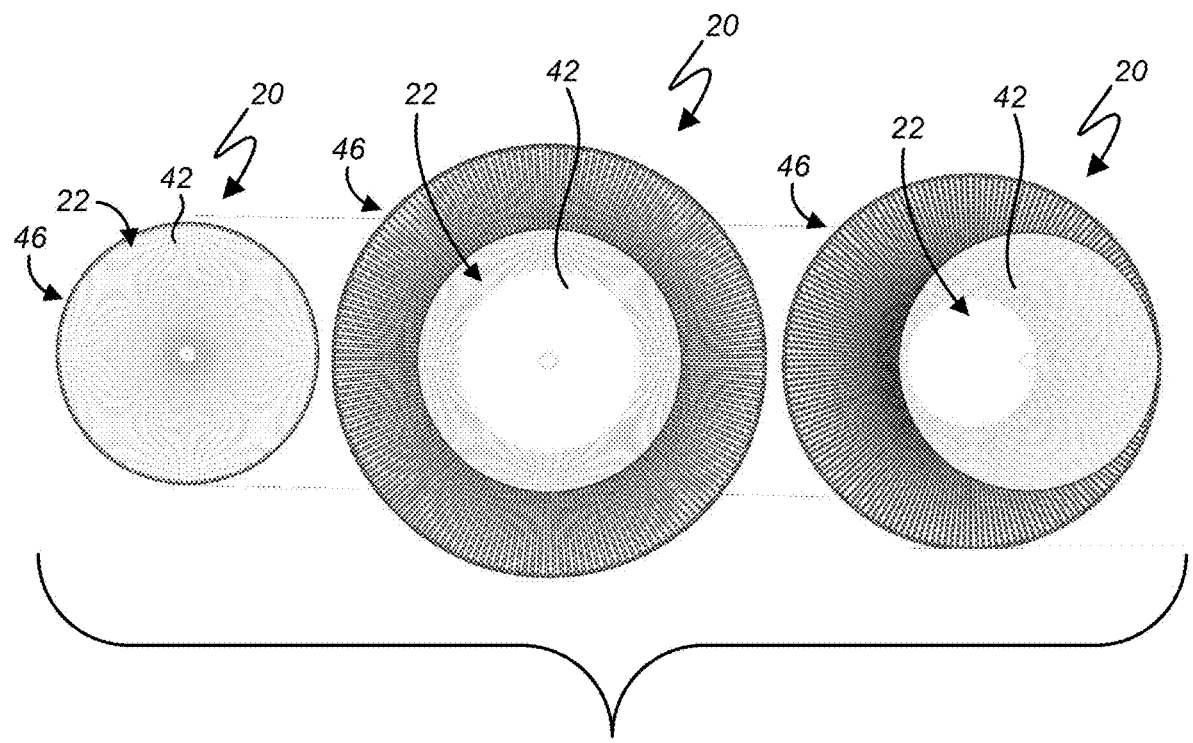
Figure 12:
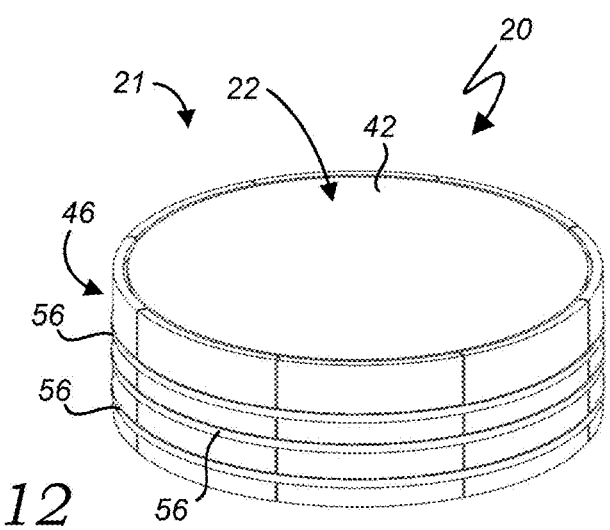
FIG. 12 is a perspective view of a still further exemplary shape-morphing apparatus, in accordance with at least one embodiment.
Figure 15:
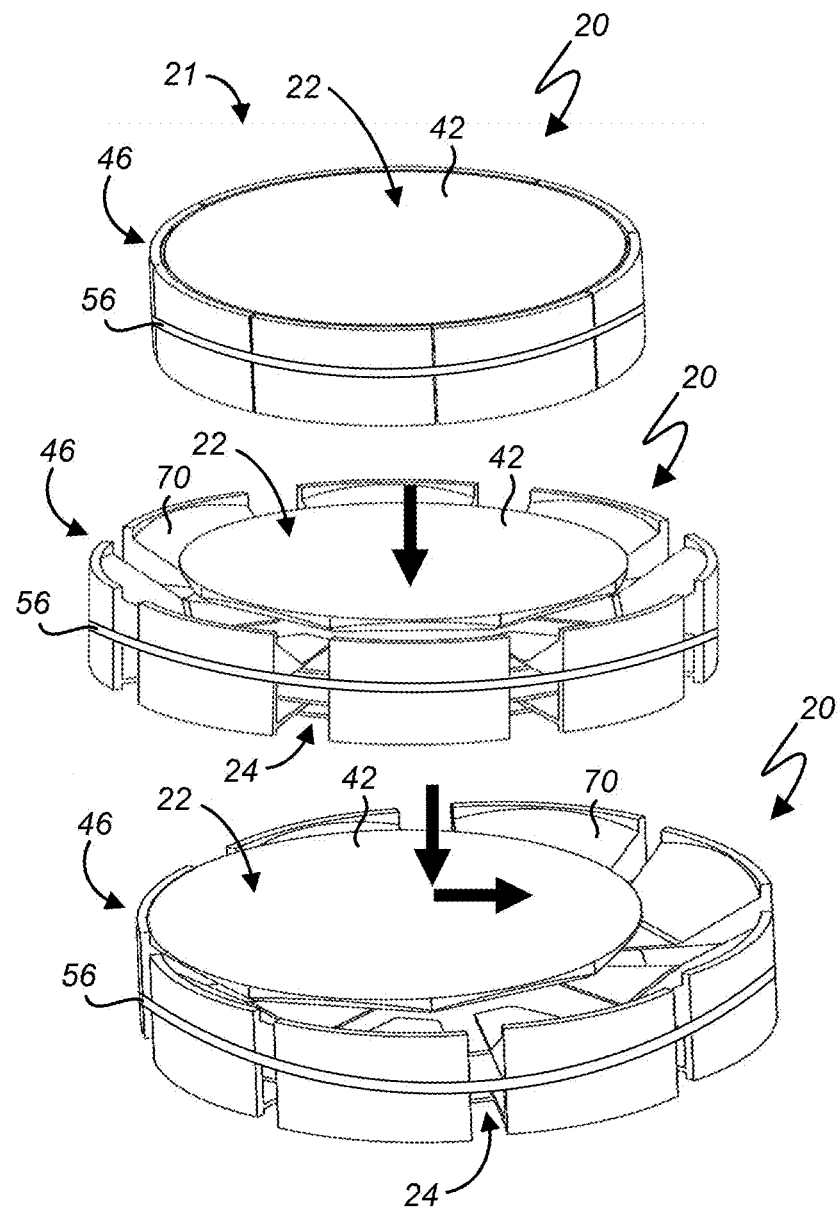
FIG. 15 is a perspective diagram of the apparatus of FIG. 12, in accordance with at least one embodiment, illustrating exemplary lateral and vertical displacements thereof.

In at least one embodiment, as illustrated in the exploded view of FIG. 7, the first composite layer 22 and second composite layer 24 are substantially circular in shape, with a plurality of clips 46 radially arranged about a circumferential edge of the first composite layer 22 and second composite layer 24. Accordingly, in such embodiments, the first composite layer 22 or the second composite layer 24 have the ability to slide in any radial direction or rotate, or perform a combination of both, based on the direction of the vibration. Clips 46 are compelled to slide in order to actuate the shape transformation of the apparatus 20. Specifically, the transformation of the shape shown in FIG. 9 is an expansion of the layer, activated by shear deformation. Additional shape transformations induced by shear deformation and the gravity, or a combination are illustrated in FIGS. 10 and 11. The flexible elements enable the apparatus 20 to morph reversibly.

Figure 19A:
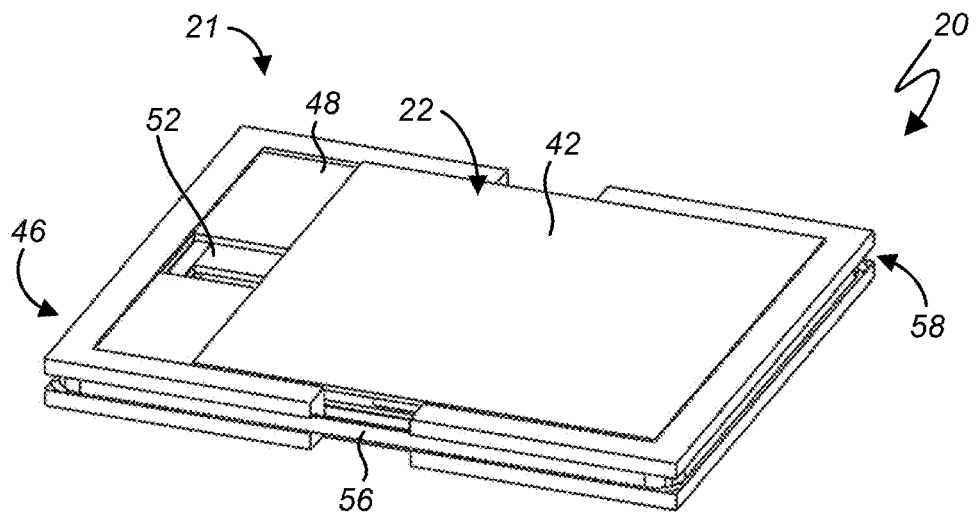
FIGS. 19A and 19B are further perspective views of the apparatus of FIG. 16, in accordance with at least one embodiment, illustrating exemplary lateral displacements thereof in both one direction (FIG. 19A) and two directions (FIG. 19B)
Figure 19B:
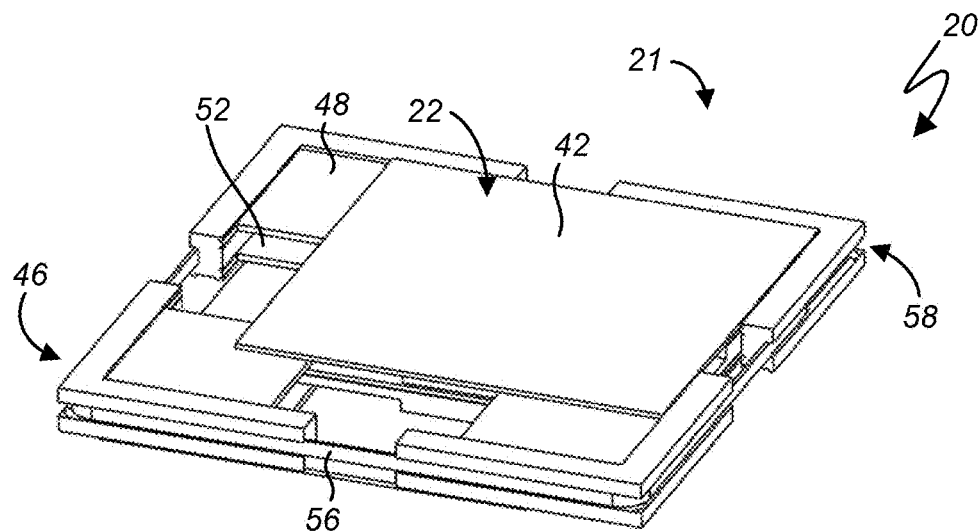

In at least one embodiment, as illustrated in FIGS. 16 and 17, the first composite layer 22 and second composite layer 24 are substantially rectangular in shape, with a clip 46 being positioned at each corner of the first composite layer 22 and second composite layer 24. In at least one such embodiment, as best illustrated in FIG. 17, the at least one first connector 30 between the first upper plate 26 and first lower plate 28 as well as the at least one second connector 36 between the second upper plate 32 and second lower plate 34 are substantially cross-shaped so as to guide the displacement of the first composite layer 22 and second composite layer 24 to create a three-dimensional rail-guide slide mechanism. Examples of multidirectional lateral displacements of such embodiments are illustrated in FIGS. 19A and 19B, which show the first composite layer 22 sliding laterally relative to the second composite layer 24.

Figure 26:
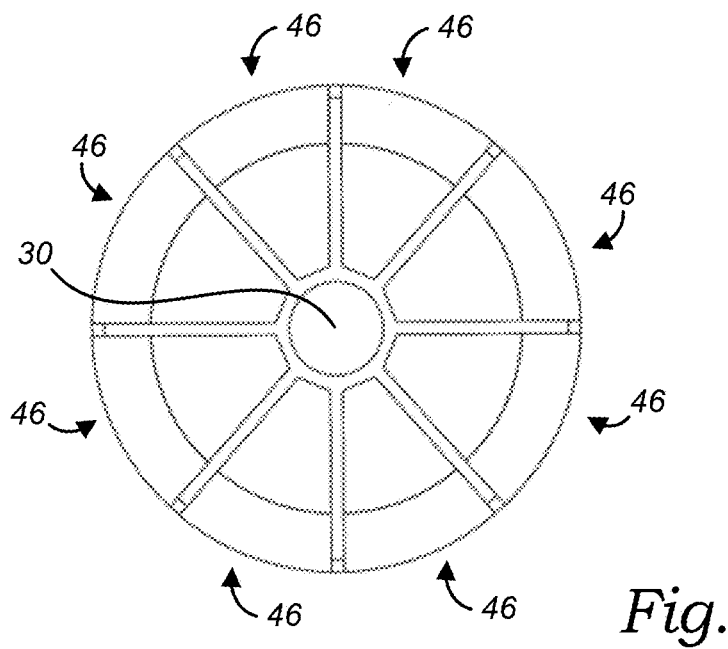
Figure 27:
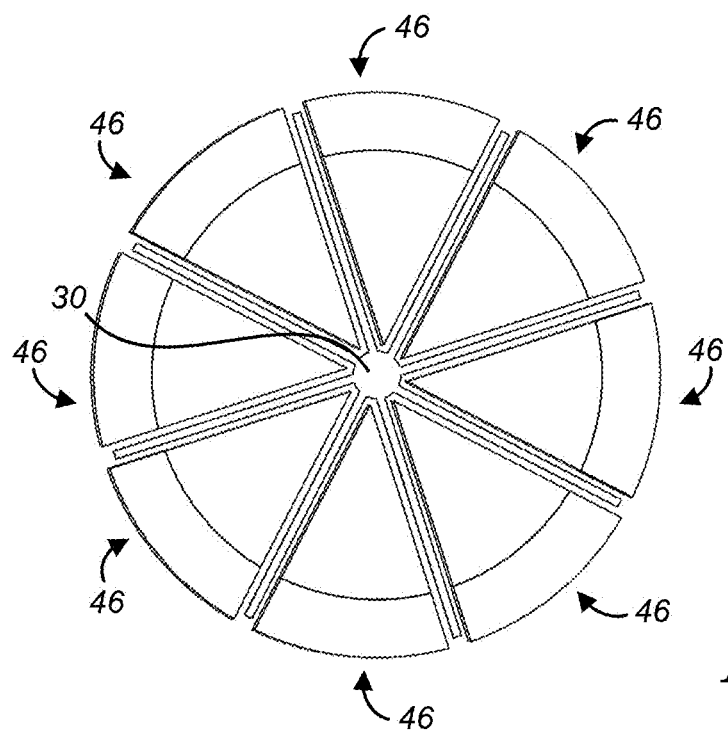

As noted above, in further embodiments, the at least one first connector 30 may be any other mechanism, structure or material, now known or later developed, capable of connecting the first upper plate 26 and first lower plate 28, while the at least one second connector 36 may be any other mechanism, structure or material, now known or later developed, capable of connecting the second upper plate 32 and second lower plate 34. In at least one such further embodiment, one or both of the at least one first connector 30 and second connector 36 is shaped for creating an optimal guide along which the first arm 48 and second arm 52 of the pins 46 may slidably travel, thereby controlling the deformability of the apparatus 20. Exemplary embodiments of such first connectors 30 and second connectors 36, along with the corresponding clips 46 are illustrated in FIGS. 23-27. In at least one such embodiment, as illustrated in FIG. 26, when the first composite layer 22 and second composite layer 24 are substantially circular in shape, a first connector 30 and second connector 36 allow any in-plane displacement. In other embodiments, the shape of a first connector 30 and second connector 36 has at least one or multiple arms that guide the sliding of the clips 46 (i.e., two arms in the cross shape of FIGS. 22 and 23, and eight arms in FIGS. 25 and 27) and prevent any rotation of the apparatus 20 around the axes perpendicular to the first and second composite layers 22 and 24.

In at least one embodiment, one or more of the first composite layer 22, second composite layer 24, clips 46, and at least one intermediate plate 60 is constructed out of a relatively rigid material. In at least one such embodiment, the material is a relatively low-friction material, thereby assisting in the slidable engagement between the components. In at least one alternate embodiment, rather than being constructed out of a relatively low-friction material, one or more of the first composite layer 22, second composite layer 24, clips 46, and at least one intermediate plate 60 is coated or lined with a relatively low-friction material—such as TEFLON or nylon, for example.

In some embodiments, when the apparatus 20 is used as vibration isolation layer, the shape-morphing apparatus 20 relied on the shear deformation or lateral displacement caused by the vibration and on the gravity or a combination to activate the shape-morphing mechanism, or a combination. Shear strain applied in one direction causes the layer to expand in one or multiple directions to continuously support the load. The expansion is driven by sliding of the parts in response to changes in the applied dynamic force. In some embodiments used for other application, such as robotic machines, external source for activation can be used including pneumatic activation, thermal activation, electric activation, or a combination. In some embodiments, the actuation mechanism includes the application of a shear deformation to the layer, or by compressing or stretching the layer or a combination.

Thus, in at least one embodiment, the apparatus 20 is capable of expanding under the dynamic excitation it might experience, while being relatively lightweight and compact in shape and maintaining stability under compressive and tensile loads from the supporting object. Furthermore, in at least one embodiment, the apparatus 20 is capable of providing a scalable, practical, cost-effective mechanical metamaterial for shock and vibration control that may fabricated in mass-producible volumes. In that regard, it should be noted that the sizes, shapes, dimensions, quantities and relative positions of the apparatus 20 and its various components (including but not limited to the first composite layer 22, the second composite layer 24, the clips 46, the at least one retainer 56 and the at least one intermediate plate 60) as depicted in the drawings (and as described herein) are merely exemplary. In further embodiments, the apparatus 20 and each of its various components may take on any other sizes, shapes, dimensions, quantities and/or relative positions, now known or later developed-dependent, at least in part, on the particular context in which the apparatus 20 is to be utilized-so long as the apparatus 20 is capable of substantially carrying out the functionality described herein.

Figure 28:
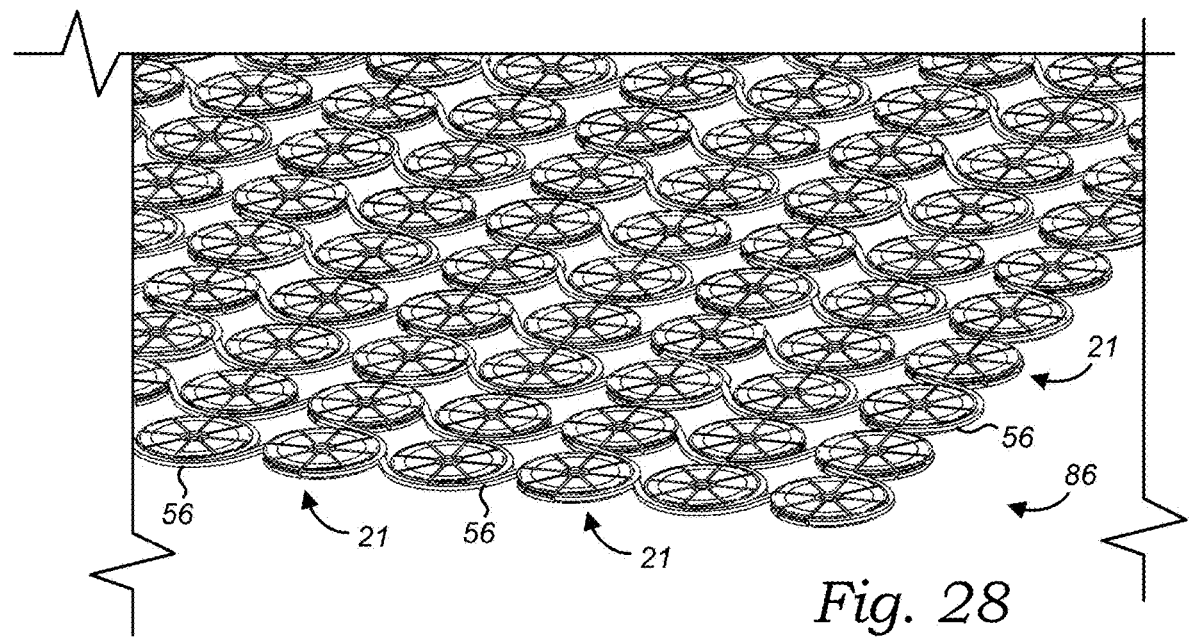
FIG. 28 is a partial perspective view of an exemplary cell layer containing a plurality of linearly arranged unit cells of the apparatus, in accordance with at least one embodiment.

In at least one embodiment, as illustrated in FIG. 28, the apparatus 20 comprises a plurality of unit cells 21 positioned in a side-by-side arrangement. For illustrative purposes, a plurality of unit cells 21 positioned in a side-by-side arrangement is referred to herein as a "cell layer" 86. In at least one such embodiment, the unit cells 21 of a given cell layer 86 are all oriented in substantially the same direction. Additionally, in at least one embodiment, a given cell layer 86 may comprise a plurality of unit cells 21 that are aligned side-by-side and joined together via one or both of their respective first or second composite layers 22 or 24. In at least one alternate embodiment, as illustrated in FIG. 28, the unit cells 26 of a given cell layer 86 are joined together via the at least one retainer 56 that not only connects the clips 46 in the same unit cell 21 but also weaves around the other unit cells 21 to create the cell layer 86. In at least one embodiment, the unit cells 21 of a given cell layer 86 may be oriented longitudinally with respect to a length of the cell layer 86. In at least one alternate embodiment, the unit cells 21 of a given cell layer 86 may be oriented perpendicularly with respect to the length of the cell layer 86. In at least one further alternate embodiment, the unit cells 21 of a given cell layer 86 may be oriented both longitudinally and perpendicularly in an alternating pattern with respect to a length of the cell layer 86. Additionally, in at least one embodiment, the unit cells 21 of a given cell layer 86 may be contiguously positioned relative to one another; while in at least one alternate embodiment, one or more of the unit cells 21 of a given cell layer 86 may be non-contiguously positioned. These cell layers 86 may take on virtually any sizes, shapes, dimensions, quantities and/or relative positions, now known or later developed-dependent at least in part on the specific context in which the apparatus 20 is to be utilized-so long as the apparatus 20 is capable of substantially carrying out the functionality described herein. Similar to the unit cells 26 of a given cell layer 86, in at least one embodiment, two or more cell layers 86 may be contiguously positioned relative to one another; while in at least one alternate embodiment, two or more cell layers 86 may be non-contiguously positioned.

In at least one embodiment, the apparatus 20 comprises a plurality of cell layers 86 positioned in a vertically stacked arrangement. In at least one embodiment, the cell layers 86 are oriented such that all unit cells 21 of a given cell layers 86 are oriented in substantially the same direction as the unit cells 21 of the other cell layers 86. In at least one alternate embodiment, the cell layers 86 are oriented such that the unit cells 21 of at least some of the cell layers 86 are oriented in a different direction relative to the unit cells 21 of the other cell layers 86—for example, in a direction substantially transverse to the direction of the unit cells 21 of each immediately adjacent cell layer 86—dependent at least in part on the specific context in which the apparatus 20 is to be utilized. In at least one embodiment, the lower surface 44 of the second lower plate 34 of the unit cells 21 of a given cell layer 86 is secured to or otherwise engaged with the upper surface 42 of the first upper plate 26 of the unit cells 21 of the immediately adjacent cell layer 86, with the lower surface 44 of the second lower plate 34 of the unit cells 21 of the bottom most cell layer 86 being positioned in direct or indirect abutting contact with the vibration source, and the upper surface 42 of the first upper plate 26 of the unit cells 21 of the top most cell layer 86 being positioned in direct or indirect abutting contact with the at least one object to be protected.

It should once again be noted that the size, shape and dimensions of the apparatus 20—including the respective sizes, shapes, dimensions and quantities of each of the unit cells 21 and cell layers 86—is dependent, at least in part, on the context in which the apparatus 20 is to be utilized. For example, in at least one embodiment, the apparatus 20 may be configured as a cushioning pallet for an object, or alternatively as a protective box. Thus, in further embodiments, each of the unit cells 21 and cell layers 86 may take on any other sizes, shapes, dimensions, positions and/or quantities, now known or later developed, so long as the apparatus 20 is capable of substantially carrying out the functionality described herein. In at least one embodiment, where the apparatus 20 comprises a plurality of unit cells 21 and/or cell layers 86, one or more of the unit cells 21 and/or cell layers 86 may optionally provide different properties or characteristics relative to one or more of the other unit cells 21 and/or cell layers 86 that govern the dynamic force control, consisting of stiffness, damping, and strength of the apparatus 20.

Aspects of the present specification may also be described as the following embodiments:

1. A shape-morphing apparatus for reducing the transmission of vibrational forces between a vibration source and an at least one object, the apparatus comprising: an at least one unit cell comprising: a first composite layer providing a first upper plate and a vertically spaced apart first lower plate connected with the first upper plate; a second composite layer providing a second upper plate and a vertically spaced apart second lower plate connected with the second upper plate; an upper surface of the first upper plate positionable in direct or indirect abutting contact with the at least one object; a lower surface of the second lower plate is positionable in direct or indirect abutting contact with the vibration source; a lower surface of the first lower plate in direct or indirect sliding abutting contact with an upper surface of the second upper plate, such that the first composite layer is capable of selectively sliding laterally in an at least one direction relative to and parallel with the second composite layer;

the lower surface of the first lower plate and upper surface of the second upper plate held in direct or indirect sliding abutting contact by at least two laterally opposing and laterally oriented U-shaped clips; and the at least two clips interconnected with one another by an at least one resilient retainer positioned and configured for biasing the clips—and, in turn, the first composite layer and second composite layer-into a neutral position.

2. The shape-morphing apparatus according to embodiment 1, wherein the first upper plate and first lower plate are connected by an at least one first connector extending between a center of the first upper plate and a center of the first lower plate.

3. The shape-morphing apparatus according to embodiments 1-2, wherein the at least one first connector is a pin.
4. The shape-morphing apparatus according to embodiments 1-3, wherein the second upper plate and second lower plate are connected by an at least one second connector extending between a center of the second upper plate and a center of the second lower plate.
5. The shape-morphing apparatus according to embodiments 1-4, wherein the at least one second connector is a pin.
6. The shape-morphing apparatus according to embodiments 1-5, wherein: a first arm of each clip is slidably positioned between the first upper plate and the first lower plate along a lateral edge of the first composite layer; and a second arm of each clip is spaced apart from the first arm and slidably positioned between the second upper plate and second lower plate along a lateral edge of the second composite layer; whereby, the first lower plate and second upper plate are positioned between the first and second arms of each clip.
7. The shape-morphing apparatus according to embodiments 1-6, wherein the first arm of each clip has a thickness that approximates a distance between the first upper plate and the first lower plate, so as to minimize or prevent displacement of the first composite layer in a vertical direction.
8. The shape-morphing apparatus according to embodiments 1-7, wherein the second arm of each clip has a thickness that approximates a distance between the second upper plate and the second lower plate, so as to minimize or prevent displacement of the second composite layer in a vertical direction.
9. The shape-morphing apparatus according to embodiments 1-8, wherein the first arm and second arm of each clip is spaced apart such that a distance between the first arm and second arm approximates a combined thickness of the first lower plate and second upper plate, so as to minimize or prevent displacement of the first composite layer and second composite layer in a vertical direction.
10. The shape-morphing apparatus according to embodiments 1-9, wherein the clips are sized and configured for allowing an amount of vertical displacement for one or both of the first composite layer and second composite layer.
11. The shape-morphing apparatus according to embodiments 1-10, wherein: the first arm of each clip has a thickness that is less than a distance between the first upper plate and the first lower plate; and a distance between the first arm and second arm of each clip is greater than a combined thickness of the first lower plate and second upper plate, thereby allowing an amount of vertical displacement for the first composite layer.
12. The shape-morphing apparatus according to embodiments 1-11, wherein the first arm of each clip provides a downwardly sloping shoulder portion positioned and configured for assisting in the vertical displacement of the first composite layer.
13. The shape-morphing apparatus according to embodiments 1-12, wherein: the second arm of each clip has a thickness that is less than a distance between the second upper plate and the second lower plate; and a distance between the first arm and second arm of each clip is greater than a combined thickness of the first lower plate and second upper plate, thereby allowing an amount of vertical displacement for the first composite layer.
14. The shape-morphing apparatus according to embodiments 1-13, wherein the second arm of each clip provides a downwardly sloping shoulder portion positioned and configured for assisting in the vertical displacement of the second composite layer.
15. The shape-morphing apparatus according to embodiments 1-14, wherein the at least one retainer is an elongate elastic band extending about a perimeter of the first composite layer and second composite layer.
16. The shape-morphing apparatus according to embodiments 1-15, wherein each of the clips provides an at least one retainer groove sized and configured for receiving the at least one retainer therewithin so as to maintain a proper position of the at least one retainer relative to the clips.
17. The shape-morphing apparatus according to embodiments 1-16, further comprising an at least one intermediate plate positioned in sliding abutting contact between the lower surface of the first lower plate and the upper surface of the second upper plate for facilitating the lateral sliding movements between the first composite layer and second composite layer.
18. The shape-morphing apparatus according to embodiments 1-17, wherein the at least one intermediate plate provides an at least one first stop positioned and configured for selectively contacting a corresponding at least one first catch provided by the lower surface of the first lower plate, thereby limiting a displacement distance by which the first composite layer is able to laterally slide relative to the second composite layer.
19. The shape-morphing apparatus according to embodiments 1-18, wherein the at least one intermediate plate provides an at least one second stop positioned and configured for selectively contacting a corresponding at least one second catch provided by the upper surface of the second upper plate, thereby limiting a displacement distance by which the second composite layer is able to laterally slide relative to the first composite layer.
20. The shape-morphing apparatus according to embodiments 1-19, wherein the first composite layer and second composite layer are substantially circular in shape, with a plurality of clips radially arranged about a circumferential edge of the first composite layer and second composite layer.
21. The shape-morphing apparatus according to embodiments 1-20, wherein the first composite layer and second composite layer are substantially rectangular in shape, with a clip positioned at each corner of the first composite layer and second composite layer.
22. The shape-morphing apparatus according to embodiments 1-21, wherein each of the at least one first connector and second connector is substantially cross-shaped.
23. The shape-morphing apparatus according to embodiments 1-22, wherein one or more of the first composite layer, second composite layer, clips, and at least one intermediate plate is constructed out of a relatively rigid material.
24. The shape-morphing apparatus according to embodiments 1-23, wherein the material is a relatively low-friction material.
25. The shape-morphing apparatus according to embodiments 1-24, wherein one or more of the first composite layer, second composite layer, clips, and at least one intermediate plate is coated or lined with a relatively low-friction material.

26. The shape-morphing apparatus according to embodiments 1-25, wherein the at least one first connector is constructed out of a resilient, deformable material in order to allow for minimal deformation between first upper plate and first lower plate.

27. The shape-morphing apparatus according to embodiments 1-26, wherein the at least one second connector is constructed out of a resilient, deformable material in order to allow for minimal deformation between second upper plate and second lower plate.

28. The shape-morphing apparatus according to embodiments 1-27, wherein the first lower plate provides at least one pair of spaced apart first catches positioned along an edge of the first lower plate and cooperating to form a linear first guide therebetween, the first guide sized and configured for slidable engagement with a corresponding first stop of the intermediate plate, thereby allowing the first stop to ride within the first guide.

29. The shape-morphing apparatus according to embodiments 1-28, wherein the first lower plate provides two pairs of spaced apart first catches defining a pair of first guides positioned along laterally opposing edges of the first lower plate and configured for slidable engagement with a pair of corresponding laterally opposed first stops provided by the intermediate plate.

30. The shape-morphing apparatus according to embodiments 1-29, wherein the second upper plate provides at least one pair of spaced apart second catches positioned along an edge of the second upper plate and cooperating to form a linear second guide therebetween, the second guide sized and configured for slidable engagement with a corresponding second stop of the intermediate plate.

31. The shape-morphing apparatus according to embodiments 1-30, wherein the second upper plate provides two pairs of spaced apart second catches defining a pair of second guides positioned along laterally opposing edges of the second upper plate and configured for slidable engagement with a pair of corresponding laterally opposed second stops provided by the intermediate plate.

32. The shape-morphing apparatus according to embodiments 1-31, wherein the lateral edges of the first lower plate on which the pair of first guides are positioned are different than the lateral edges of the second upper plate on which the pair of second guides are positioned.

33. The shape-morphing apparatus according to embodiments 1-32, wherein the at least one first guide is a recessed slot positioned within the lower surface of the first lower plate and configured for slidably receiving the corresponding at least one first stop of the intermediate plate therewithin.

34. The shape-morphing apparatus according to embodiments 1-33, wherein the at least one second guide is a recessed slot positioned within the upper surface of the second upper plate and configured for slidably receiving the corresponding at least one second stop of the intermediate plate therewithin.

35. The shape-morphing apparatus according to embodiments 1-34, wherein the at least one first guide is laterally oriented in a direction substantially transverse to the at least one second guide.

36. The shape-morphing apparatus according to embodiments 1-35, wherein the apparatus comprises a plurality of unit cells positioned in a side-by-side arrangement, thereby forming an at least one cell layer.

37. The shape-morphing apparatus according to embodiments 1-36, wherein the unit cells of a given cell layer are joined together via the at least one retainer that not only connects the clips in the same unit cell but also weaves around the other unit cells to create the cell layer.

38. The shape-morphing apparatus according to embodiments 1-37, wherein the apparatus comprises a plurality of cell layers positioned in a vertically stacked arrangement.

39. The shape-morphing apparatus according to embodiments 1-38, wherein at least one of the intermediate plate, first connector and second connector is constructed out of a vibration absorbing metamaterial.

40. A shape-morphing apparatus for reducing the transmission of vibrational forces between a vibration source and an at least one object, the apparatus comprising: an at least one unit cell comprising: a first composite layer providing a first upper plate and a vertically spaced apart first lower plate connected with the first upper plate; a second composite layer providing a second upper plate and a vertically spaced apart second lower plate connected with the second upper plate; an upper surface of the first upper plate positionable in direct or indirect abutting contact with the at least one object; a lower surface of the second lower plate is positionable in direct or indirect abutting contact with the vibration source; a lower surface of the first lower plate in direct or indirect sliding abutting contact with an upper surface of the second upper plate, such that the first composite layer is capable of selectively sliding laterally in an at least one direction relative to and parallel with the second composite layer; the lower surface of the first lower plate and upper surface of the second upper plate held in direct or indirect sliding abutting contact by at least two laterally opposing and laterally oriented U-shaped clips, a first arm of each clip slidably positioned between the first upper plate and the first lower plate along a lateral edge of the first composite layer, and a second arm of each clip spaced apart from the first arm and slidably positioned between the second upper plate and second lower plate along a lateral edge of the second composite layer, such that the first lower plate and second upper plate are positioned between the first and second arms of each clip; and the at least two clips interconnected with one another by an at least one resilient retainer positioned and configured for biasing the clips—and, in turn, the first composite layer and second composite layer—into a neutral position.

41. A shape-morphing apparatus for reducing the transmission of vibrational forces between a vibration source and an at least one object, the apparatus comprising: an at least one unit cell comprising: a first composite layer providing a first upper plate and a vertically spaced apart first lower plate connected with the first upper plate; a second composite layer providing a second upper plate and a vertically spaced apart second lower plate connected with the second upper plate; an upper surface of the first upper plate positionable in direct or indirect abutting contact with the at least one object; a lower surface of the second lower plate is positionable in direct or indirect abutting contact with the vibration source; an at least one intermediate plate positioned in sliding abutting contact between a lower surface of the first lower plate and an upper surface of the second upper plate, such that the first composite layer is capable of selectively sliding laterally in an at least one direction relative to and parallel with the second composite layer; the at least one intermediate plate held in sliding abutting contact between the lower surface of the first lower plate and upper surface of the second upper plate by at least two laterally opposing and laterally oriented U-shaped clips; and the at least two clips interconnected with one another by an at least one resilient retainer positioned and configured for biasing the clips—and, in turn, the first composite layer and second composite layer-into a neutral position.

In closing, regarding the exemplary embodiments of the present invention as shown and described herein, it will be appreciated that an shape-morphing apparatus is disclosed and configured for providing shock and vibration protection. Because the principles of the invention may be practiced in a number of configurations beyond those shown and described, it is to be understood that the invention is not in any way limited by the exemplary embodiments, but is generally directed to an shape-morphing apparatus and is able to take numerous forms to do so without departing from the spirit and scope of the invention. It will also be appreciated by those skilled in the art that the present invention is not limited to the particular geometries and materials of construction disclosed, but may instead entail other functionally comparable structures or materials, now known or later developed, without departing from the spirit and scope of the invention.

Certain embodiments of the present invention are described herein, including the best mode known to the inventor(s) for carrying out the invention. Of course, variations on these described embodiments will become apparent to those of ordinary skill in the art upon reading the foregoing description. The inventor(s) expect skilled artisans to employ such variations as appropriate, and the inventor(s) intend for the present invention to be practiced otherwise than specifically described herein. Accordingly, this invention includes all modifications and equivalents of the subject matter recited in the claims appended hereto as permitted by applicable law. Moreover, any combination of the above-described embodiments in all possible variations thereof is encompassed by the invention unless otherwise indicated herein or otherwise clearly contradicted by context.

Groupings of alternative embodiments, elements, or steps of the present invention are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Unless otherwise indicated, all numbers expressing a characteristic, item, quantity, parameter, property, term, and so forth used in the present specification and claims are to be understood as being modified in all instances by the terms "about" and "approximately." As used herein, the terms "about" and "approximately" mean that the characteristic, item, quantity, parameter, property, or term so qualified encompasses a range of plus or minus ten percent above and below the value of the stated characteristic, item, quantity, parameter, property, or term. Accordingly, unless indicated to the contrary, the numerical parameters set forth in the specification and attached claims are approximations that may vary. At the very least, and not as an attempt to limit the application of the doctrine of equivalents to the scope of the claims, each numerical indication should at least be construed in light of the number of reported significant digits and by applying ordinary rounding techniques. Notwithstanding that the numerical ranges and values setting forth the broad scope of the invention are approximations, the numerical ranges and values set forth in the specific examples are reported as precisely as possible. Any numerical range or value, however, inherently contains certain errors necessarily resulting from the standard deviation found in their respective testing measurements. Recitation of numerical ranges of values herein is merely intended to serve as a shorthand method of referring individually to each separate numerical value falling within the range. Unless otherwise indicated herein, each individual value of a numerical range is incorporated into the present specification as if it were individually recited herein. Similarly, as used herein, unless indicated to the contrary, the term "substantially" is a term of degree intended to indicate an approximation of the characteristic, item, quantity, parameter, property, or term so qualified, encompassing a range that can be understood and construed by those of ordinary skill in the art, or at least encompassing a range of plus or minus ten percent above and below the value of the stated characteristic, item, quantity, parameter, property, or term.

Use of the terms "may" or "can" in reference to an embodiment or aspect of an embodiment also carries with it the alternative meaning of "may not" or "cannot." As such, if the present specification discloses that an embodiment or an aspect of an embodiment may be or can be included as part of the inventive subject matter, then the negative limitation or exclusionary proviso is also explicitly meant, meaning that an embodiment or an aspect of an embodiment may not be or cannot be included as part of the inventive subject matter. In a similar manner, use of the term "optionally" in reference to an embodiment or aspect of an embodiment means that such embodiment or aspect of the embodiment may be included as part of the inventive subject matter or may not be included as part of the inventive subject matter. Whether such a negative limitation or exclusionary proviso applies will be based on whether the negative limitation or exclusionary proviso is recited in the claimed subject matter.

The terms "a," "an," "the" and similar references used in the context of describing the present invention (especially in the context of the following claims) are to be construed to cover both the singular and the plural, unless otherwise indicated herein or clearly contradicted by context. Further, ordinal indicators—such as "first," "second," "third," etc.— for identified elements are used to distinguish between the elements, and do not indicate or imply a required or limited number of such elements, and do not indicate a particular position or order of such elements unless otherwise specifically stated. All methods described herein can be performed in any suitable order unless otherwise indicated herein or otherwise clearly contradicted by context. The use of any and all examples, or exemplary language (e.g., "such as") provided herein is intended merely to better illuminate the present invention and does not pose a limitation on the scope of the invention otherwise claimed. No language in the present specification should be construed as indicating any non-claimed element essential to the practice of the invention.

When used in the claims, whether as filed or added per amendment, the open-ended transitional term "comprising" (along with equivalent open-ended transitional phrases thereof such as "including," "containing" and "having") encompasses all the expressly recited elements, limitations, steps and/or features alone or in combination with un-recited subject matter; the named elements, limitations and/or features are essential, but other unnamed elements, limitations and/or features may be added and still form a construct within the scope of the claim. Specific embodiments disclosed herein may be further limited in the claims using the closed-ended transitional phrases "consisting of" or "consisting essentially of" in lieu of or as an amendment for "comprising." When used in the claims, whether as filed or added per amendment, the closed-ended transitional phrase "consisting of" excludes any element, limitation, step, or feature not expressly recited in the claims. The closed-ended transitional phrase "consisting essentially of" limits the scope of a claim to the expressly recited elements, limitations, steps and/or features and any other elements, limitations, steps and/or features that do not materially affect the basic and novel characteristic(s) of the claimed subject matter. Thus, the meaning of the open-ended transitional phrase "comprising" is being defined as encompassing all the specifically recited elements, limitations, steps and/or features as well as any optional, additional unspecified ones. The meaning of the closed-ended transitional phrase "consisting of" is being defined as only including those elements, limitations, steps and/or features specifically recited in the claim, whereas the meaning of the closed-ended transitional phrase "consisting essentially of" is being defined as only including those elements, limitations, steps and/or features specifically recited in the claim and those elements, limitations, steps and/or features that do not materially affect the basic and novel characteristic(s) of the claimed subject matter. Therefore, the open-ended transitional phrase "comprising" (along with equivalent open-ended transitional phrases thereof) includes within its meaning, as a limiting case, claimed subject matter specified by the closed-ended transitional phrases "consisting of" or "consisting essentially of." As such, embodiments described herein or so claimed with the phrase "comprising" are expressly or inherently unambiguously described, enabled and supported herein for the phrases "consisting essentially of" and "consisting of."

Any claims intended to be treated under 35 U.S.C. § 112 (f) will begin with the words "means for," but use of the term "for" in any other context is not intended to invoke treatment under 35 U.S.C. § 112 (f). Accordingly, Applicant reserves the right to pursue additional claims after filing this application, in either this application or in a continuing application.

It should be understood that any methods disclosed herein, along with the order in which the respective elements of any such method are performed, are purely exemplary. Depending on the implementation, they may be performed in any order or in parallel, unless indicated otherwise in the present disclosure.

All patents, patent publications, and other publications referenced and identified in the present specification are individually and expressly incorporated herein by reference in their entirety for the purpose of describing and disclosing, for example, the compositions and methodologies described in such publications that might be used in connection with the present invention. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents are based on the information available to the applicants and does not constitute any admission as to the correctness of the dates or contents of these documents.

While aspects of the invention have been described with reference to at least one exemplary embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

What is claimed is:

1. A shape-morphing apparatus for reducing the transmission of vibrational forces between a vibration source and an at least one object, the apparatus comprising:
    an at least one unit cell comprising:
        a first composite layer providing a first upper plate and a vertically spaced apart first lower plate connected with the first upper plate;
        a second composite layer providing a second upper plate and a vertically spaced apart second lower plate connected with the second upper plate;
        an upper surface of the first upper plate positionable in direct or indirect abutting contact with the at least one object;
        a lower surface of the second lower plate is positionable in direct or indirect abutting contact with the vibration source;
        a lower surface of the first lower plate in direct or indirect sliding abutting contact with an upper surface of the second upper plate, such that the first composite layer is capable of selectively sliding laterally in an at least one direction relative to and parallel with the second composite layer, and the second composite layer is likewise capable of selectively sliding laterally in an at least one direction relative to and parallel with the first composite layer;
        the lower surface of the first lower plate and upper surface of the second upper plate held in direct or indirect sliding abutting contact by at least two laterally opposing and laterally oriented U-shaped clips, a first arm of each clip slidably positioned between the first upper plate and the first lower plate along a lateral edge of the first composite layer, and a second arm of each clip spaced apart from the first arm and slidably positioned between the second upper plate and second lower plate along a lateral edge of the second composite layer, such that the first lower plate and second upper plate are positioned between the first and second arms of each clip; and
        the at least two clips interconnected with one another by an at least one resilient retainer positioned and configured for biasing the clips—and, in turn, the first composite layer and second composite layer—into a neutral position.

2. The shape-morphing apparatus of claim 1, wherein the first upper plate and first lower plate are connected by an at least one first connector extending between a center of the first upper plate and a center of the first lower plate.

3. The shape-morphing apparatus of claim 1, wherein the second upper plate and second lower plate are connected by an at least one second connector extending between a center of the second upper plate and a center of the second lower plate.

4. The shape-morphing apparatus of claim 1, wherein the first arm of each clip has a thickness that approximates a distance between the first upper plate and the first lower plate, so as to minimize or prevent displacement of the first composite layer in a vertical direction.

5. The shape-morphing apparatus of claim 1, wherein the second arm of each clip has a thickness that approximates a distance between the second upper plate and the second lower plate, so as to minimize or prevent displacement of the second composite layer in a vertical direction.

6. The shape-morphing apparatus of claim 1, wherein the first arm and second arm of each clip is spaced apart such that a distance between the first arm and second arm approximates a combined thickness of the first lower plate and second upper plate, so as to minimize or prevent displacement of the first composite layer and second composite layer in a vertical direction.

7. The shape-morphing apparatus of claim 1, wherein the clips are sized and configured for allowing an amount of vertical displacement for one or both of the first composite layer and second composite layer.

8. The shape-morphing apparatus of claim 7, wherein:
the first arm of each clip has a thickness that is less than a distance between the first upper plate and the first lower plate; and
a distance between the first arm and second arm of each clip is greater than a combined thickness of the first lower plate and second upper plate, thereby allowing an amount of vertical displacement for the first composite layer.

9. The shape-morphing apparatus of claim 8, wherein the first arm of each clip provides a downwardly sloping shoulder portion positioned and configured for assisting in the vertical displacement of the first composite layer.

10. The shape-morphing apparatus of claim 1, wherein the at least one retainer is an elongate elastic band extending about a perimeter of the first composite layer and second composite layer.

11. The shape-morphing apparatus of claim 10, wherein each of the clips provides an at least one retainer groove sized and configured for receiving the at least one retainer therewithin so as to maintain a proper position of the at least one retainer relative to the clips.

12. The shape-morphing apparatus of claim 1, further comprising an at least one intermediate plate positioned in sliding abutting contact between the lower surface of the first lower plate and the upper surface of the second upper plate for facilitating the lateral sliding movements between the first composite layer and second composite layer.

13. The shape-morphing apparatus of claim 12, wherein the at least one intermediate plate provides an at least one first stop positioned and configured for selectively contacting a corresponding at least one first catch provided by the lower surface of the first lower plate, thereby limiting a displacement distance by which the first composite layer is able to laterally slide relative to the second composite layer.

14. The shape-morphing apparatus of claim 12, wherein the at least one intermediate plate provides an at least one second stop positioned and configured for selectively contacting a corresponding at least one second catch provided by the upper surface of the second upper plate, thereby limiting a displacement distance by which the second composite layer is able to laterally slide relative to the first composite layer.

15. The shape-morphing apparatus of claim 1, wherein the first composite layer and second composite layer are substantially circular in shape, with a plurality of clips radially arranged about a circumferential edge of the first composite layer and second composite layer.

16. The shape-morphing apparatus of claim 1, wherein the first composite layer and second composite layer are substantially rectangular in shape, with the clips positioned at each corner of the first composite layer and second composite layer.

17. The shape-morphing apparatus of claim 16, wherein;
the first upper plate and first lower plate are connected by an at least one substantially cross-shaped first connector extending between a center of the first upper plate and a center of the first lower plate; and
the second upper plate and second lower plate are connected by an at least one substantially cross-shaped second connector extending between a center of the second upper plate and a center of the second lower plate.

18. A shape-morphing apparatus for reducing the transmission of vibrational forces between a vibration source and an at least one object, the apparatus comprising:
an at least one unit cell comprising:
a first composite layer providing a first upper plate and a vertically spaced apart first lower plate connected with the first upper plate by an at least one first connector extending between a center of the first upper plate and a center of the first lower plate;
a second composite layer providing a second upper plate and a vertically spaced apart second lower plate connected with the second upper plate by an at least one second connector extending between a center of the second upper plate and a center of the second lower plate;
an upper surface of the first upper plate positionable in direct or indirect abutting contact with the at least one object;
a lower surface of the second lower plate is positionable in direct or indirect abutting contact with the vibration source;
a lower surface of the first lower plate in direct or indirect sliding abutting contact with an upper surface of the second upper plate, such that the first composite layer is capable of selectively sliding laterally in an at least one direction relative to and parallel with the second composite layer, and the second composite layer is likewise capable of selectively sliding laterally in an at least one direction relative to and parallel with the first composite layer;
the lower surface of the first lower plate and upper surface of the second upper plate held in direct or indirect sliding abutting contact by at least two laterally opposing and laterally oriented U-shaped clips, a first arm of each clip slidably positioned between the first upper plate and the first lower plate along a lateral edge of the first composite layer, and a second arm of each clip spaced apart from the first arm and slidably positioned between the second upper plate and second lower plate along a lateral edge of the second composite layer, such that the first lower plate and second upper plate are positioned between the first and second arms of each clip; and
the at least two clips interconnected with one another by an at least one resilient retainer positioned and configured for biasing the clips—and, in turn, the first composite layer and second composite layer—into a neutral position.

19. A shape-morphing apparatus for reducing the transmission of vibrational forces between a vibration source and an at least one object, the apparatus comprising:

an at least one unit cell comprising:
- a first composite layer providing a first upper plate and a vertically spaced apart first lower plate connected with the first upper plate;
- a second composite layer providing a second upper plate and a vertically spaced apart second lower plate connected with the second upper plate;
- an upper surface of the first upper plate positionable in direct or indirect abutting contact with the at least one object;
- a lower surface of the second lower plate is positionable in direct or indirect abutting contact with the vibration source;
- an at least one intermediate plate positioned in sliding abutting contact between a lower surface of the first lower plate and an upper surface of the second upper plate, such that the first composite layer is capable of selectively sliding laterally in an at least one direction relative to and parallel with the second composite layer, and the second composite layer is likewise capable of selectively sliding laterally in an at least one direction relative to and parallel with the first composite layer;
- the at least one intermediate plate held in sliding abutting contact between the lower surface of the first lower plate and upper surface of the second upper plate by at least two laterally opposing and laterally oriented U-shaped clips, a first arm of each clip slidably positioned between the first upper plate and the first lower plate along a lateral edge of the first composite layer, and a second arm of each clip spaced apart from the first arm and slidably positioned between the second upper plate and second lower plate along a lateral edge of the second composite layer, such that the first lower plate and second upper plate are positioned between the first and second arms of each clip; and
- the at least two clips interconnected with one another by an at least one resilient retainer positioned and configured for biasing the clips—and, in turn, the first composite layer and second composite layer—into a neutral position.

\* \* \* \* \*